United States Patent
Suzuki et al.

(10) Patent No.: US 6,457,967 B1
(45) Date of Patent: Oct. 1, 2002

(54) BIAXIAL STRETCH BLOW MOLDING MACHINE

(75) Inventors: Saburo Suzuki; Masanobu Seki; Hidehiko Fukai, all of Nagano-ken (JP)

(73) Assignee: Frontier Inc., Nagano-ken (JP)

(*) Notice: Subject to any disclaimer, the term of this patent is extended or adjusted under 35 U.S.C. 154(b) by 0 days.

(21) Appl. No.: 09/581,283

(22) PCT Filed: Oct. 19, 1999

(86) PCT No.: PCT/JP99/05770

§ 371 (c)(1),
(2), (4) Date: Jun. 30, 2000

(87) PCT Pub. No.: WO00/23253

PCT Pub. Date: Apr. 27, 2000

(30) Foreign Application Priority Data

Oct. 20, 1998 (JP) .......................................... 10-298178

(51) Int. Cl.[7] .......................... B29C 49/64; B29C 49/06
(52) U.S. Cl. ...................... 425/526; 425/452; 425/529; 425/534
(58) Field of Search ............................ 425/526, 529, 425/534, 541, 253, 452, 470

(56) References Cited

U.S. PATENT DOCUMENTS

| | | | |
|---|---|---|---|
| 4,313,905 A | * 2/1982 | Hafele | 264/532 |
| 4,362,498 A | * 12/1982 | Harry et al. | 425/526 |
| 4,365,950 A | * 12/1982 | Harry et al. | 425/534 |
| 4,522,581 A | 6/1985 | Schad et al. | 425/534 |
| 4,690,633 A | * 9/1987 | Schad et al. | 264/535 |
| 4,693,375 A | * 9/1987 | Schweers | 209/532 |
| 4,846,663 A | * 7/1989 | Just-Hanig | 425/534 |
| 5,902,612 A | * 5/1999 | Ogihara | 425/526 |

FOREIGN PATENT DOCUMENTS

| | | | | |
|---|---|---|---|---|
| JP | 61-76342 | | 4/1986 | |
| JP | 10-76567 | | 3/1998 | |
| WO | WO 91/01870 | * | 2/1991 | 425/526 |

* cited by examiner

Primary Examiner—Robert Davis
(74) Attorney, Agent, or Firm—Burns, Doane, Swecker & Mathis, L.L.P.

(57) ABSTRACT

A biaxially stretching blow molding apparatus perform biaxial stretch-molding for a preform into a predetermined shape by transporting a preform carrier supporting the preform along a transporting path extending across a heating portion and a stretch-molding portion, has first and second reversing means for reversing the preform carrier, and first and second transporting paths forming the transporting path. The first reversing means receives the preform carrier transported in up-side-down position along the second transporting path, reverses the received preform carrier into elected position, and transfers the preform carrier thus reversed to the first transporting path. The second reversing means receives the preform carrier transported in elected position along the first transporting path, reverses the received preform carrier into the up-side-down position, and transfers the preform carrier thus reversed to the second transporting path.

8 Claims, 17 Drawing Sheets

*Fig. 2A*
*Fig. 2B*
*Fig. 2C*
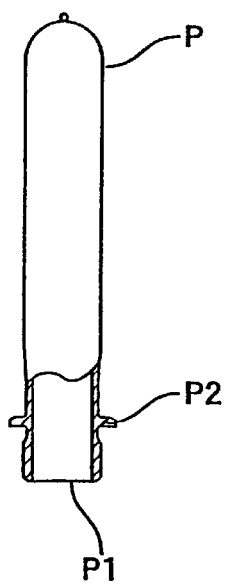
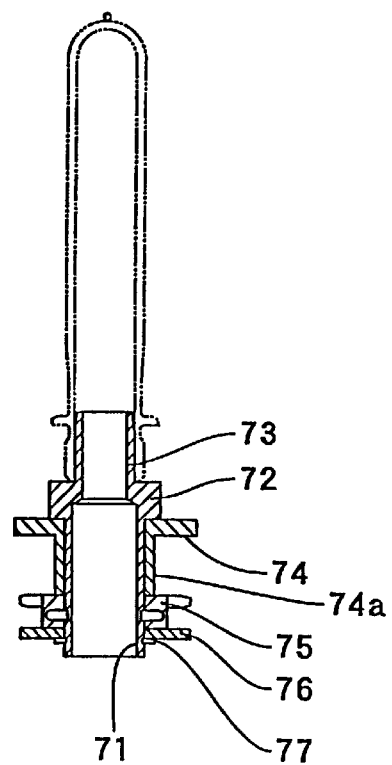
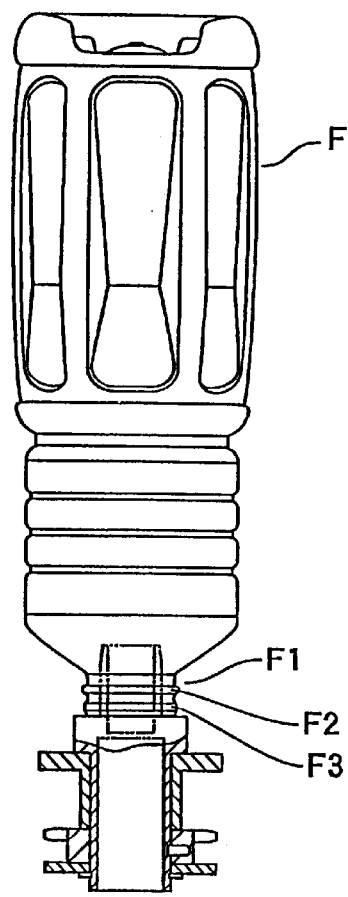

9A—9A

BIAXIAL STRETCH BLOW MOLDING MACHINE

BACKGROUND OF THE INVENTION

1. Field of the Invention

The present invention relates to a biaxially blow molding apparatus forming a predetermined shape of molded product by transporting a preform carrier carrying a preform along a transporting path extending across a heating portion and a stretch-molding portion and by performing biaxially stretching blow molding for the preform.

2. Description of the Related Art

A biaxially stretching blow molding apparatus producing resin products, such as PET bottle or so forth, by biaxially stretching blow molding, is constructed to heat a primary molded product which is called as a preform, up to a temperature adapted for molding during transportation across the heating portion, and then perform biaxially stretching blow molding for the preform in a stretch-molding die forming the stretch-molding portion.

A typical biaxially stretching blow molding apparatus has a construction including a preform supply portion, a preform heating portion, a stretch-molding portion and a molded product taking out portion, and continuously or intermittently circulating a plurality of preforms along a guide rail defining a transporting path extending across respective of the foregoing portions. On the other hand, a typical preform carrier has a construction including a slide portion guided by the guide rail to move therealong, and a core portion extending from the slide portion to be inserted into the preform.

The preform is loaded on each preform carrier in the preform supply portion so that an opening mouth of the preform is set on the core portion of the preform carrier. On the other hand, the molded product obtained by performing biaxially stretching blow molding for the preform in the stretch-molding portion is unloaded from each preform carrier by releasing an opening in a neck portion of the molded product from the core portion of the preform carrier in the product taking out portion and collected in a predetermined collecting site. Furthermore, the empty preform carrier unloaded the molded product is returned to the preform supply portion for loading the next preform.

In the biaxially stretching blow molding apparatus having a construction to support the preform by the preform carrier which is continuously transported along the predetermined circulating path, it has been strongly demanded to speeding up operation at respective portions for improving overall process performance and whereby for improving cost effectiveness.

On the other hand, the preform carrier unloaded the molded product after passing through the stretch-molding portion is schematically returned to the preform supply portion again by-passing the stretch molding portion. When the by-pass passage for the empty preform carrier can be formed through a dead space below the stretch-molding portion, the circulating path may be constructed in compact. In such case, height difference is caused in the circulating path to require transfer of the preform, the molded product and the preform carrier between the transporting paths having height difference. If transfer operation can be done efficiently, process speed of the biaxially stretching blow molding apparatus can be improved.

Next, the preform transported by the preform carrier along the circulating path is formed into the molded product which has greater width and greater height in comparison with the preform in the stretch-molding portion. Therefore, it becomes necessary to provide greater feeding pitch of the preform carrier on the upstream side of the stretch-molding portion. If transporting operation for the preform carrier can be done efficiently by converting operation of the feeding pitch and with widened feeding pitch, process speed of the biaxially stretching blow molding apparatus can be further improved.

On the other hand, a mold clamping mechanism which opens and closes a pair of stretch-molding dies in order to perform stretch-molding of the preform, generally has a construction to open and close each stretch-molding dies which are slidably supported, by means of an air cylinder via a toggle link mechanism. If opening and closing operation of the stretch-molding dies by the mold clamping mechanism can be done efficiently, process speed of the biaxially stretching blow molding apparatus can be further improved.

SUMMARY OF THE INVENTION

The present invention has been worked out in order to satisfy demands set forth above. Therefore, it is an object of the present invention to provide a biaxially stretching blow molding apparatus which has high process speed by improving efficiency of operation in respective components.

Another and more particular object of the present invention to provide a biaxially stretching blow molding apparatus which can efficiently perform transfer operation of a preform, a molded product and a preform carrier between transporting paths having height difference.

A further object of the present invention is to provide a biaxially stretching blow molding apparatus which can efficiently perform an operation for expanding a feeding pitch of the preform carriers on upstream side of a stretch-molding portion and a transporting operation of the preform carrier with the expanded feeding pitch.

A still further object of the present invention is to provide a biaxially stretching blow molding apparatus which can efficiently perform mold clamping operation of a pair of stretch-molding dies for performing biaxially stretching blow molding.

In order to accomplish the above-identified and other objects, according to the first aspect of the present invention, a biaxially stretching blow molding apparatus perform biaxial stretch-molding for a preform into a predetermined shape by transporting a preform carrier supporting the preform along a transporting path extending across a heating portion and a stretch-molding portion, comprises:

first and second reversing means for reversing the preform carrier;

first and second transporting paths forming the transporting path;

the first reversing means receiving the preform carrier transported in up-side-down position along the second transporting path, reversing the received preform carrier into elected position, and transferring the preform carrier thus reversed to the first transporting path; and the second reversing means receiving the preform carrier transported in elected position along the first transporting path, reversing the received preform carrier into the up-side-down position, and transferring the preform carrier thus reversed to the second transporting path.

In order to make the first and second transporting paths compact, it is preferred that the first transporting path is an upper transporting path extending across a stretch-molding position of the stretch-molding portion, and the second transporting path is a lower transporting path extending lower side of the stretch-molding portion. With this construction, in comparison with the case where the second transporting path is arranged by-passing the stretch molding portion having largest dimension in the width direction in lateral direction, the biaxially stretching blow molding apparatus can have compact construction.

On the other hand, it is possible that at least one of the first and second reversing means has a pivoting member pivoting about a predetermined pivot center and a pair of preform holding portion formed at symmetric positions of the pivoting member with respect to the pivot center. In this case, it is desirable that one of the preform holding portions being placed at a height corresponding to the upper transporting path and the other preform holding portion being placed at a height corresponding to the lower transporting path at pivot stop position of the pivoting member.

With the construction set forth above, whenever the pivoting member is pivoted, both of the preform carrier holding portions are respectively positioned at the height positions corresponding to the upper and lower transporting paths. Therefore, transfer of the preform carriers between respective preform carrier holding portions and the upper and lower transporting paths can be done efficiently.

Here, the preform holding portion may have a guide groove, into which the preform carrier can be inserted in lateral direction in a condition not withdrawn in vertical direction. On the other hand, the preform carrier may have a slide portion sliding along the transporting path and being inserted into the guide groove, and a core projecting from the slide portion for inserting into the preform.

The biaxially stretching blow molding apparatus may further comprise a preform supply portion. The preform supply portion may comprise:

the first reversing means having the pivoting member and the preform carrier holding portion;

preform inserting means for loading an opening portion of the preform from lower side to the core of the preform carrier held in up-side down position in a guide groove of one of the preform carrier holding portions in the first reversing means; and feeding out means for feeding out the preform carrier held in elected position with supporting the preform in the guide groove of the other preform carrier holding portion of the first reversing means.

With the preform supply portion constructed as set forth above, while operation for receiving the empty preform carrier in one of the preform carrier holding portions, preform loading operation for the preform carriers and transferring of the preform carriers supporting the preforms to the transporting path are performed on the side of the other preform carrier holding portion. Since mutually different operations are performed simultaneously in both of the preform carrier holding portions, operation of the preform supply portion can be efficient to enhance process speed of the biaxially stretching blow molding apparatus.

Here, it is desirable that the preform supply portion has a drop preventing means for preventing dropping of the preform loaded on the core of the preform carrier by the preform inserting means from the core.

On the other hand, by arranging the preform carrier holding portions at symmetric positions relative to the reversing shaft as a center of the pivoting member, complete balance in weight can be established to contribute for speeding up reversing operation.

Next, the biaxially stretching blow molding apparatus has a molded product taking out portion. The molded product taking out portion may comprises:

the second reversing means having the pivoting member and the preform carrier holding portion;

a pair of gripping pieces gripping neck portions of the molded products from both sides loaded on the preform carriers respectively held in the preform carrier holding portion;

gripping piece opening and closing means for moving the gripping pieces between a molded product gripping position and a molded product releasing position;

molding product removing means for removing the core of the preform carrier from the neck portion of the molded product gripped by the gripping pieces;

a pair of guide plates which can be guided in a horizontal direction with supporting the neck portions of the molded products loaded on the preform carriers respectively held in the preform carrier holding portion;

guide plate opening and closing means for moving the guide plates between a guiding position of the molded product and a molded product releasing position retracted from the guiding position.

In the molded product taking out portion constructed as set forth above, while operation for receiving the preform carrier supporting the molded product in one of the preform carrier holding portion, withdrawal of the molded products from the preform carriers and feeding out of the emptied preform carriers are performed in the other preform carrier holding portions. Since mutually different operations are performed simultaneously in both of the preform carrier holding portions, operation of the molded product taking out portion can be efficient to enhance process speed of the biaxially stretching blow molding apparatus.

Herein, it is desirable that the molded product taking out portion comprises detecting means for checking good item and no-good item of the molded product supported by the preform carrier; and control means for controlling opening and closing of a pair of the pair of gripping pieces and the pair of guide plates on the basis of result of checking by the detecting means and controlling opening and closing of a pair of the pair of gripping pieces and the pair of guide plates when the preform is supported without being blow molded.

On the other hand, similarly to the preform supply portion, by arranging the preform carrier holding portions at symmetric positions relative to the reversing shaft as a center of the pivoting member, complete balance in weight can be established to contribute for speeding up reversing operation.

According to the second aspect of the present invention, a biaxially stretching blow molding apparatus perform biaxial stretch-molding for a preform into a predetermined shape by transporting a preform carrier supporting the preform along a transporting path extending across a heating portion and a stretch-molding portion, comprises:

a pitch expansion mechanism for expanding a feed pitch of the preform carriers fed into the stretch-molding portion and feeding out from the stretch-molding portion, a transferring mechanism for feeding said preform carrier into said stretch-molding portion and for feeding out said preform carrier from said stretch-molding portion by said pitch expansion mechanism.

the pitch expansion mechanism including first and second holding members simultaneously holding at least first and second preform carriers transported along the transporting path in lateral direction, holding member moving means for expanding an interval between the first and second holding members, in which the preform carriers are held, and holding member moving means for moving the first and second holding members between a preform holding position and a retracted position retracted from the preform holding position, and the transferring mechanism including a holding plate holding the first and second preform carriers from lateral direction after expanding the pitch, holding plate moving means for moving the holding plate between a preform holding position and a retracted position retracted from the preform holding position, and holding plate feeding means for moving the holding plate along the transporting path for feeding the first and second preform carriers which is expanded the pitch therebetween into the stretch-molding portion and feeding out from the stretch-molding portion.

In the biaxially stretching blow molding apparatus constructed as set forth above, pitch expanding operation and transporting operation of the preform carrier with the expanded pitch are performed separately and independently of the other. Accordingly, in comparison with the case where both operation are performed with the single mechanism to perform these operation more quickly to result in higher process speed of the biaxially stretching blow molding apparatus.

According to the third aspect of the present invention, a biaxially stretching blow molding apparatus perform biaxial stretch-molding for a preform into a predetermined shape by transporting a preform carrier supporting the preform along a transporting path extending across a heating portion and a stretch-molding portion, comprises:

the stretch-molding portion having a pair of stretch-molding dies and a claming mechanism for opening and closing the stretch-molding dies;

the clamping mechanism comprising:

a first toggle link mechanism for moving one of the stretch-molding dies between an opening position and a closing position;

a second toggle link mechanism for moving the other the stretch molding die between an opening position and a closing position; and a swing mechanism for reciprocally moving the first and second toggle link mechanism at respective link connection points in opposite direction in synchronism with each other.

The swing mechanism comprises swing member, first and second end portions of the swing member located at symmetric position about swing center, and first and second connecting members connected to respective link connection points of the first and second toggle link mechanisms.

With the clamping mechanism constructed as set forth above, since die opening operation and clamping operation of a pair of stretch-molding dies can be performed with complete synchronization with the other, these operation can be done efficiently. On the other hand, the first and second toggle link mechanism are moved in mutually opposite directions. Also, load to be exerted upon clamping and opening of dies can act symmetrically about the center of swing motion, local concentration of the load upon clamping or die opening may not act. Furthermore, no impact force may be exerted. Accordingly, these operation can be done smoothly. Thus, since clamping and die opening can be done smoothly, clamping operation and die opening operation can be done quickly and smoothly to result in higher process speed of the biaxially stretching blow molding apparatus.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 2A is an explanatory illustration showing a shape of a preform;

FIG. 2B is an explanatory illustration showing a structure of a preform carrier;

FIG. 2C is an explanatory illustration showing a shape of a molded product;

DESCRIPTION OF THE PREFERRED EMBODIMENT

The present invention will be discussed hereinafter in detail in terms of the preferred embodiment of the present invention with reference to the accompanying drawings, particularly in terms of a biaxially stretching blow molding apparatus for molding a polyethylene terephthalate (PET) bottle, with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

(Overall Construction and Operation)

Figure 1A:
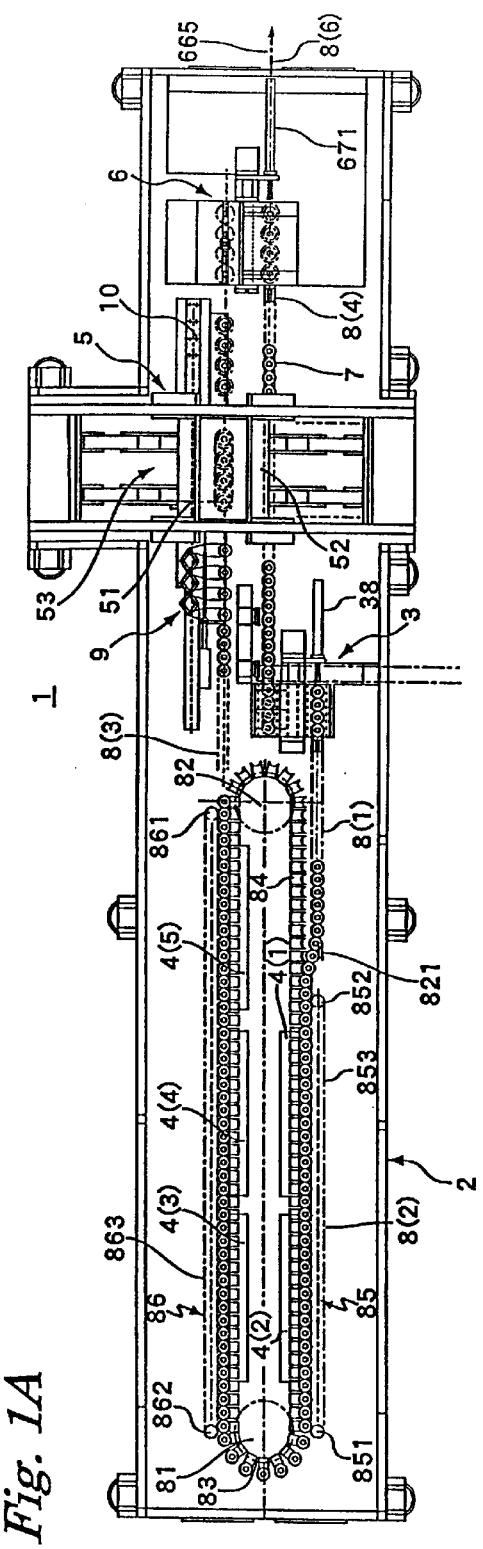
FIG. 1A is a schematic plan view of a biaxially stretching blow molding apparatus, to which the present invention is applied.
Figure 1B:
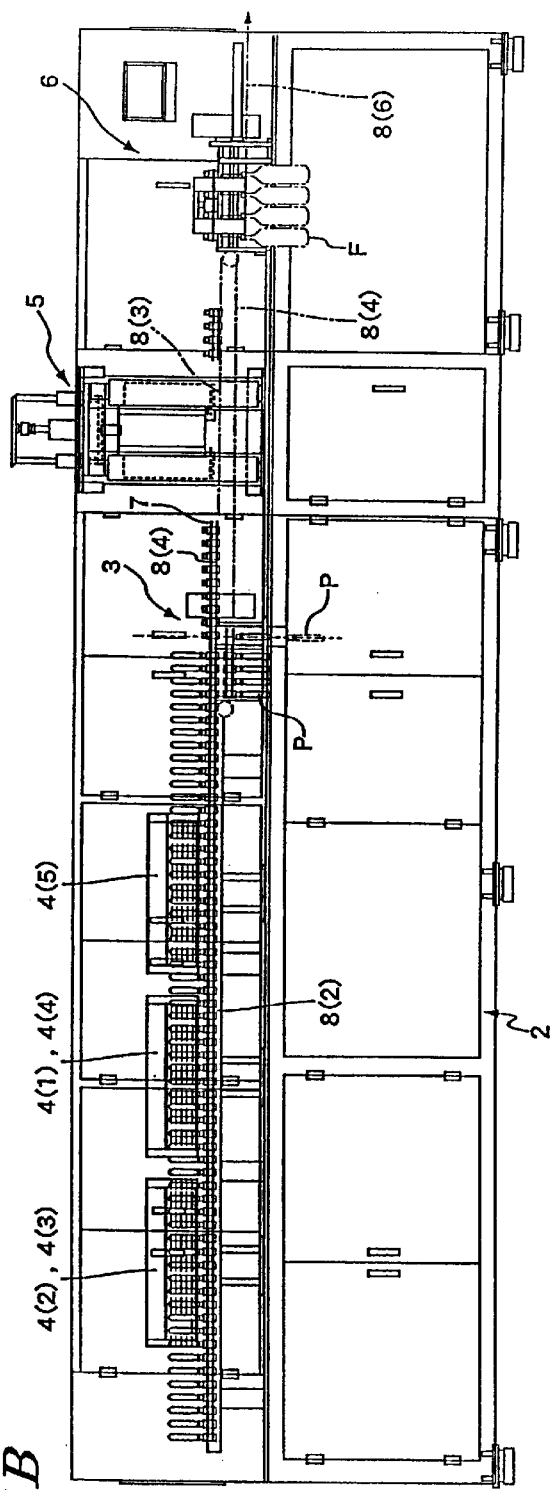
FIG. 1B is a schematic side elevation of the biaxially stretching blow molding apparatus of FIG. 1A.

FIG. 1A is a schematic plan view of a biaxially stretching blow molding apparatus, to which the present invention is applied, and FIG. 1B is a schematic side elevation of the biaxially stretching blow molding apparatus of FIG. 1A. Discussing with reference to these drawings, a biaxially stretching blow molding apparatus 1 has a laterally elongated base frame 2. On the upper surface of the base frame 2, a preform supply portion 3, a preform heating portion 4(1) to 4(5), a stretch-molding portion 5 of a preform P, and a molded product taking out portion 6 are arranged in sequential order along a preform transporting path.

The shown embodiment of the preform supply portion 3 receives a preform carrier 7 unloaded a molded product F and transported in an up-side-down condition. After loading the preform P, the preform carrier 7 is reversed to place in an elected condition. Thereafter, the preform carrier 7 carrying the preform P is transferred to a pair of guide rails 8(1) defining a transporting path at a higher level. Therefore, the preform supply portion 3 is provided with a first reversing means.

The preform carriers 7 transferred to a pair of guide rails 8(1) are sequentially pushed forward along the guide rails 8(1) and transferred to a transporting path 8(2) passing through heater portions 4(1) to 4(5). The transporting path 8(2) has a transporting belt 83 stretched between a drive pulley 81 and a driven pulley 82 and a plurality of transporting members 84 of preform carriers mounted on the transporting belt 83 with a given interval and circulated together with the transporting belt 83. One of straight transporting path portions defined by the transporting belt 83 extends through a heating portion formed by heater portions 4(1) and 4(2). In this portion, a drive mechanism 85 is provided for rotating the preform P supported on the preform carrier 7 transported by the transporting member 84, on its own axis. Similarly, the other straight transporting path portion defined by the transporting belt 83 extends through a heating portion formed by heater portions 4(3) to 4(5). In this portion, a drive mechanism 86 is provided for rotating the preform P supported on the preform carrier 7 transported by the transporting member 84, on its own axis.

The preform carriers 7 transferred from a pair of guide rails 8(1) to the transporting members 84 of the transporting path 8(2) are sequentially transported through the heating portions formed by the heater portions 4(1) to 4(5). On the other hand, while passing through the heating portions, the preforms P supported by the preform carriers 7 are driven by the drive mechanisms 85 and 86 for causing rotation on their own axes to be heated the outer peripheral surfaces of respective preforms P uniformly.

The preform carriers 7 supporting the preforms P heated through the heater portions 4(1) to 4(5) at a temperature suitable for molding, is transferred to an upper transporting path defined by a pair of guide rails 8(3). The guide rails 8(3) extend through a stretch-molding portion 5. The stretch-molding portion 5 has left and right stretch-molding dies 51 and 52 on opposite sides of the preform transporting path defined by the guide rails 8(3). These stretch-molding dies 51 and 52 are opened and closed by means of a clamping mechanism 53.

On the upstream side of the stretch-molding portion 5 in the preform transporting direction, a feeding pitch expansion mechanism 9 is arranged. The preform carriers 7 continuously transported toward the stretch-molding portion 5 along the guide rails 8 (3), expands a feeding pitch to be suitable for the molded products F by the feeding pitch expansion mechanism 9.

Thereafter, with maintaining the expanded feeding pitch, the preforms P supported by the preform carriers 7 are fed into stretch-molding position of the stretch-molding portion 5 by a transfer mechanism 10. In the stretch-molding portion 5, the preform P is formed into a predetermined shape of PET bottle (molded product) through a biaxially stretching blow molding. The preform carrier 7 supporting the PET bottle as the molded product is fed out from the stretch-molding portion 5 along the guide rails 8 (3) by the transfer mechanism 10 with maintaining the expanded feed pitch. Furthermore, by the transfer mechanism, the PET bottle as the molded product is transferred to the molded product taking out portion 6 with maintaining the expanded feed pitch.

The molded product taking out portion 6 receives the preform carrier supporting the PET bottle from the guide rails 8(3) and reverses the same. Furthermore, from the preform carrier 7 placed in up-side-down position by reversal, the PET bottle is removed. Thereafter, the preform carrier 7 emptied by removal of the molded product is transferred with maintaining the up-side-down position to a lower transporting path defined by a pair of guide rails 8(4) which are arranged horizontally at a level lower than the level of the guide rails 8(3).

The molded product 7 removed from the preform carrier 7 is transferred to a molded product collecting path 8(6) extending in the opposite direction of the guide rail 8(4), and is collected in a not shown collecting portion. Such molded product taking out portion 6 is provided with a second reversing means.

The guide rail 8(4) extends to the preform supply portion 3 through a dead space below a pair of stretch-molding dies 51 and 52 of the stretch-molding portion 5, and transfer to the empty preform carrier 7 held in up-side-down position to the preformed supply portion 3. In the preform supply portion 3, after loading the preform on the preform carrier 7 received in the up-side-down position, the preform carrier 7 is reversed into elected position. Thereafter, the preform carrier 7 is transferred to a pair of the guide rails 8(1) defining the transporting path located at higher level than the guide rails 8(4).

Subsequently, the foregoing procedure is repeated to transfer the preform by each preform carrier and to repeat biaxially stretching blow molding.

(Preform, Preform Carrier and Molded Product)

FIGS. 2A to 2C are illustration showing the preform P, the preform carrier 7 and the molded product F. As shown in FIG. 2A, the preform P is a primary PET molded product formed into a test-tube like shape with an opening P1 at one end thereof. On the outer peripheral surface in the vicinity of the opening P1, an annular projection P2 is formed.

As shown in FIG. 2B, the preform carrier 7 has a cylindrical main body 71. On the outer periphery of the cylindrical main body 71, a flange 72 of greater diameter is formed. A portion on one side of the flange 72 is formed as a core portion 73 to be inserted into the opening of the preform P. On the outer periphery of the portion on the other side of the flange 72, an annular flange 74, an annular external gear 75 and an annular plate 76 are mounted in sequential order, and are fixed with preventing loosing out by a fastening ring 77. The annular flange 74 has the largest diameter and serves as a slide portion for sliding horizontally along guide rails which will be discussed later. On the other hand, the cylindrical main body 71 placed inside of the annular flange 74 is rotatable with respect to the annular flange 74. On the cylindrical main body, the annular external gear 75 is fixed for rotation therewith. Accordingly, when the external gear 75 is rotatingly driven by a timing belt or the like, the cylindrical main body is driven to rotate about. Therefore, in a condition where the core portion 73 formed in the tip end is inserted, the preform P is rotated on its own axis.

Next, in FIG. 2C, there is illustrated the molded product F obtained by the biaxially stretched blow molding in the stretch-molding portion 5. As set forth above, the molded product in the shown embodiment is the PET bottle. On the outer peripheral surface of a next portion F1 is provided with at least one annular projection. In the shown embodiment, two annular projections F2 and F3 are provided.

(Guide Rail)

Figure 3A:
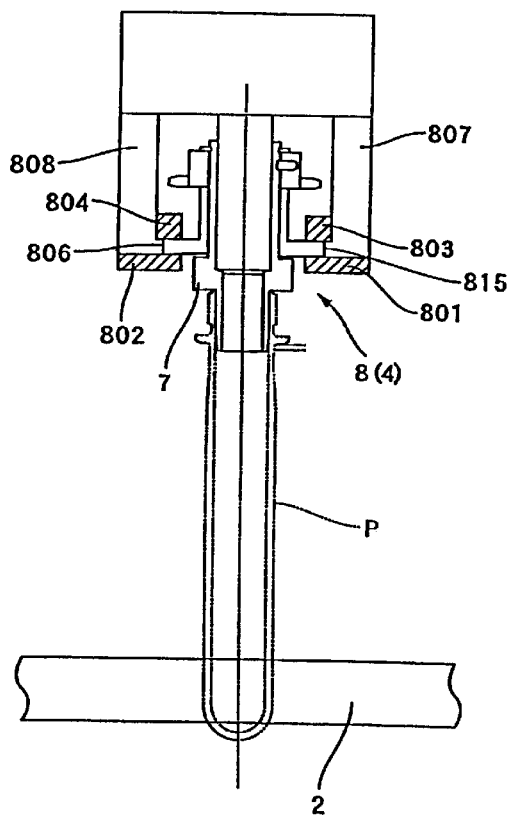
FIGS. 3A and 3B are schematic sections of an upper transporting path and a lower transporting path in the biaxially stretching blow molding apparatus of FIGS. 1A and 1B.
Figure 3B:
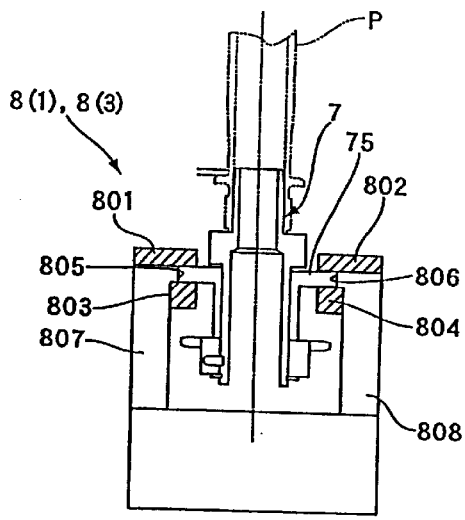

FIG. 3A shows guide rails 8(1) and 8(3) for transporting the preform carrier 7 in elected position and FIG. 3B show the guide rails 8(4) transporting the preform carrier 7 in up-side-down position. On the other hand, FIGS. 3A and 3B also show a height relationship between both guide rails. Namely, the guide rails 8(4) are lower guide rails located at the lowermost height level, and the guide rails 8(1) and 8(3) are upper guide rails.

The guide rails 8(1) and 8(3) have a pair of left and right upper rail frames 801 and 802 and a pair of left and right lower rail frames 803 and 804. The upper rail frames 801 and 802 are horizontally arranged in parallel relationship with each other with a given spacing therebetween. Similarly, the lower rail frames 803 and 804 are horizontally arranged in parallel relationship with each other with a given spacing therebetween. With respectively corresponding upper and lower rail frames 801, 803 and 802, 804, guide grooves 805 and 806, into which the annular flange 74 of the preform carrier 7 can be slidably inserted, are defined. These frame frames 801 to 804 are mounted on a mounting frames or a mounting plates 807 and 808. The mounting plates 807 and 808 are supported by a base frame 2 via a not shown support frame.

The other guide rails 8(4) have a structure the same as that of the guide rails 8(1) and 8(3) and placed in reversed position. Accordingly, the corresponding parts will be identified by the same reference numerals as those for the guide rails 8(21) and 8(3), and detailed discussion therefore will be neglected for avoiding redundant discussion for keeping the disclosure simple enough to facilitate clear understanding of the present invention. The shown embodiment of the guide rails 8(1), 8(3) and 8(4) are provide structures which can transport the preform carrier 7 in a condition not permitting loosing out of the preform carrier in vertical direction.

(Preform Supply Portion)

As set forth above, the shown embodiment of the preform supply portion 3 receives the empty preform carrier 7 which has been unloaded by removal of the molded product F and transported in the up-side-down position along the lower guide rails 8(4). After loading the preform P on the preform carrier 7, the preform carrier 7 is reversed into the elected position. Thereafter, the preform carrier 7 is transferred to a pair of guide rails 8(1) defining the transporting path located at higher position.

Figure 4:
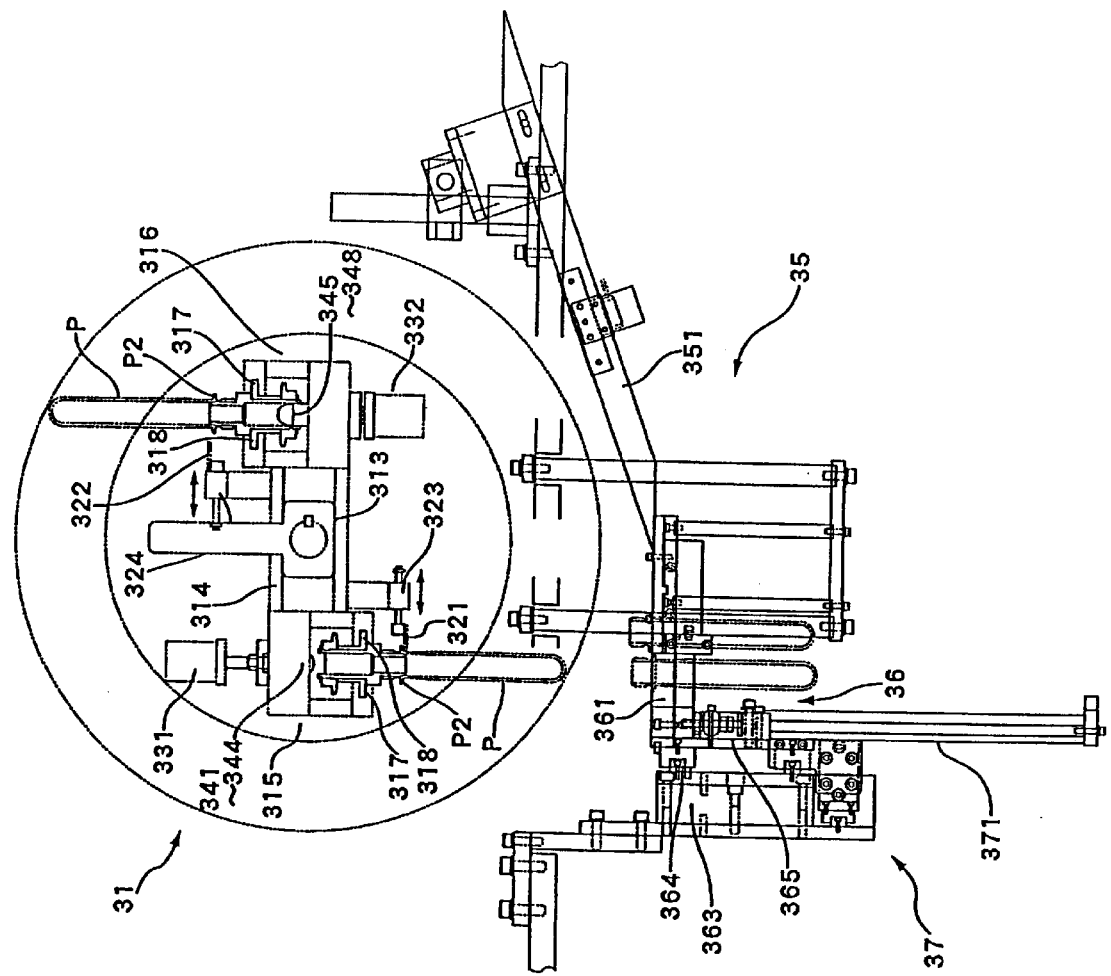
FIG. 4 is a schematic constructional illustration of a preform supply portion in the biaxially stretching blow molding apparatus of FIG. 1 as viewed from a preform transporting direction.
Figure 5:
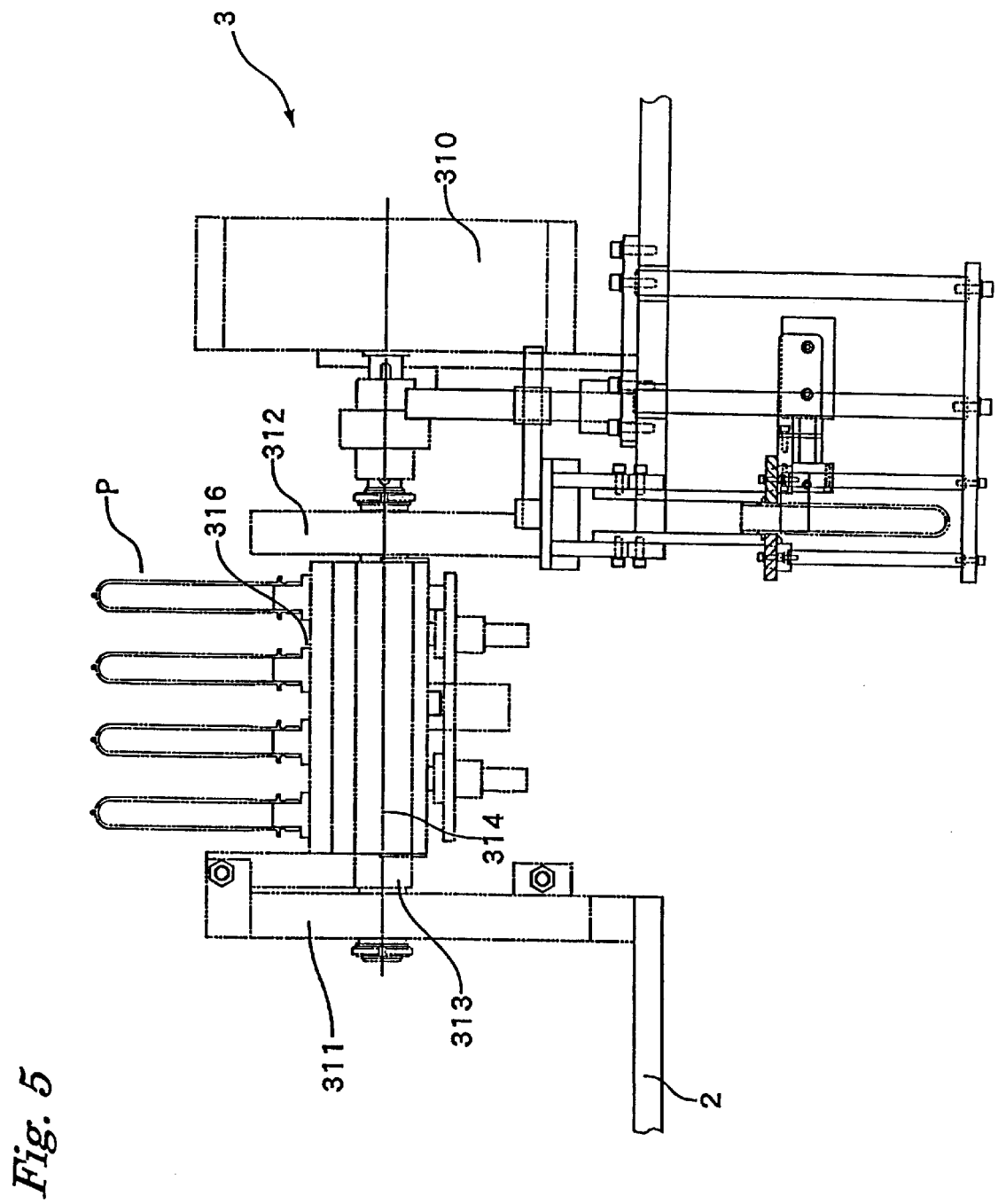
FIG. 5 is a schematic constructional illustration showing the preform supply portion of FIG. 4 as viewed from a direction perpendicular to the preform transporting direction.
Figure 6:
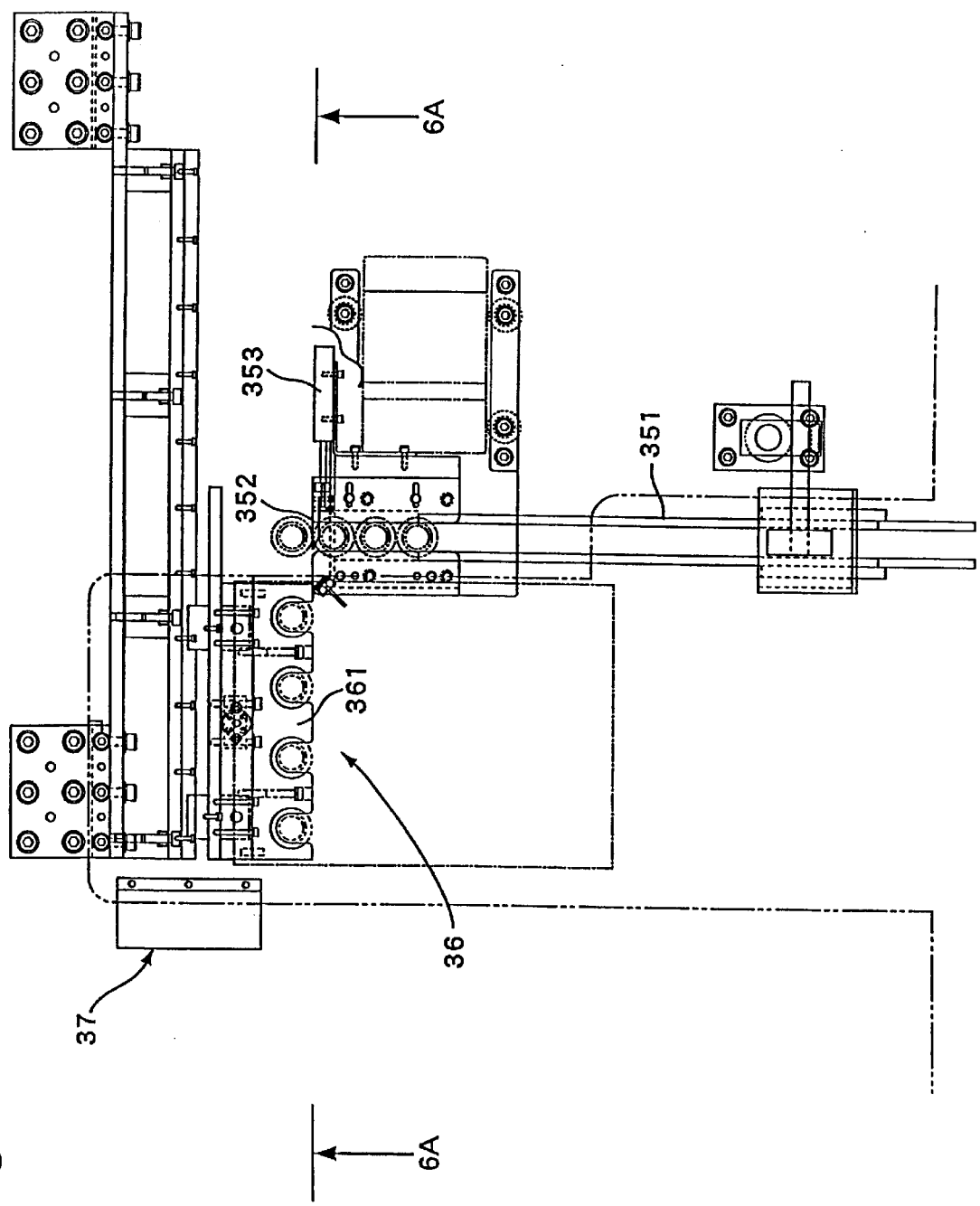
FIG. 6 is a schematic constructional plan view of the preform supply portion of FIG. 4.
Figure 7:
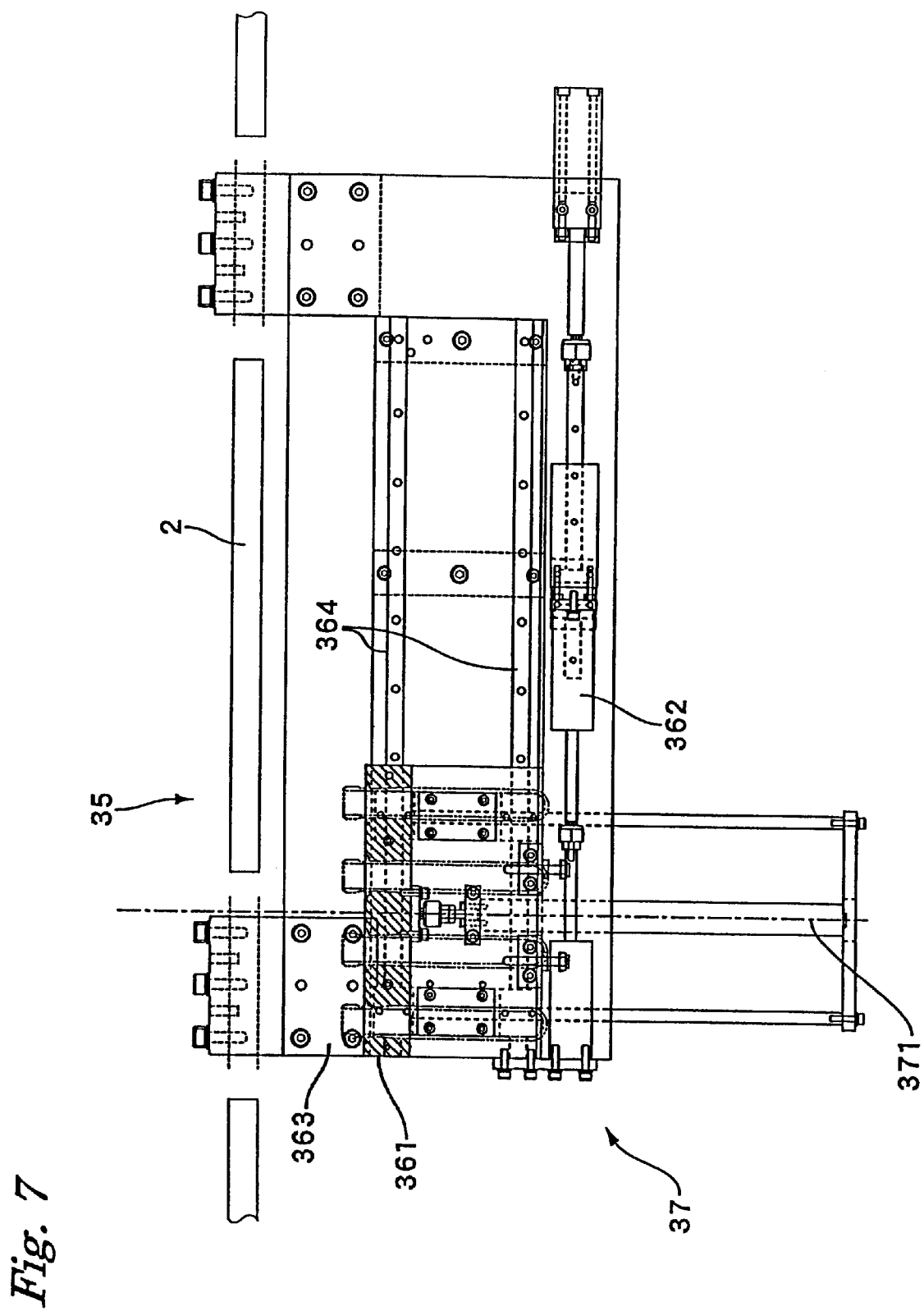
FIG. 7 is a schematic constructional illustration of the case where the preform supply portion is viewed in a direction of arrow A of FIG. 6.

FIG. 4 is a schematic constructional illustration of a preform supply portion as viewed from a preform transporting direction, FIG. 5 is a schematic constructional illustration showing the preform supply portion as viewed from a direction perpendicular to the preform transporting direction, FIG. 6 is a schematic constructional plan view of the preform supply portion and FIG. 7 is a schematic constructional illustration of the case where the preform supply portion is viewed in a direction of arrow 6A of FIG. 6.

Referring to FIGS. 4 to 7, the preform supply portion 3 includes a carrier reversing mechanism 31 for reversing the preform carrier 7 held in the up-side-down position into the elected position, and a preform loading mechanism 35 supplying the preform P from lower side for the preform carrier 7 held in the up-side-down position by the carrier reversing mechanism 31.

The carrier reversing mechanism 31 has a pivot shaft 313 extended horizontally between a pair of support frame 311 and 312 mounted on the base frame 2, a rotary cylinder 310 rotating the pivot shaft 313 in forward and reverse directions and a pivot member 314 for rotation integrally with the pivot shaft 313. The pivot member 314 has a shape symmetric about the pivot shaft 313 and has carrier holding portions 315 and 316 at both ends thereof. In the carrier holding portion 315, a pair of guide grooves 317 and 318 are formed in the same cross-sectional shape with the guide rail 8(4).

The guide grooves 317 and 318 of the carrier holding portion 315 are placed at positions respectively matching with positions of the guide grooves 805 and 806 of the lower guide rails 8(4) as placed at an initial position of the pivot member 314, namely pivot stop position shown in the drawing. The other carrier holding portion 316 also has a pair of guide grooves 317 and 318 of the same cross-sectional shape as the guide rail 8(1). These guide grooves 317 and 318 are placed at positions respectively matching with positions of the guide grooves 805 and 806 of the upper guide rails 8(1) as placed at an initial position of the pivot member 314, namely pivot stop position shown in the drawing.

On the other hand, in respective of the carrier holding portions 316 and 317, preform drop down preventing claws 321 and 322 are arranged. The preform drop down preventing claws 321 and 322 are movable in horizontal direction by drive mechanism, such as electromagnetic solenoids 323 and 324. In order to prevent the preform P loaded on the insertion core portion 73 of the preform carrier held on the carrier holding portions 316 and 317, from loosing off the core portion 73, the preform drop down preventing claws 321 and 322 are designed for engaging with the annular projecting portion P2 of the preform in the projecting position (one of the claws 321 is placed in the projected position in FIG. 4). When the claws 321 and 322 are returned to the retracted position (the other claw 322 is placed in the retracted position in FIG. 4), the claws 321 and 322 are released from the annular projection P2 of the preform P.

In the shown embodiment, respective of carrier holding portions 315 and 316 have guide grooves of the length which can hold four preform carriers 7 at once to reverse the preform carrier 7 per four. So as to prevent the preform carrier 7 (7(1) to 7(4)) held by respective carrier holding portions 315 and 316 from moving along the guide groove, positioning plungers 331 and 332 are provided. By projecting four actuation rods 341 to 344 of the positioning plunger 331, positions of the four preform carriers 7 held in the carrier holding portion 315 are fixed. Similarly, by projecting four actuation rods 345 to 348 of the positioning plunger 331, positions of the four preform carriers 7 held in the carrier holding portion 316 are fixed.

Next, the preform loading mechanism 35 includes a titled supply groove for permitting new preforms P to slid down therealong by its own weight, an aligning mechanism 36 receiving the preforms P one by one at the lower end position of the tilted supply groove 351 and aligning four preforms in a horizontal direction perpendicular to the tilted supply groove 351 with a given pitch, and a loading mechanism 37 listing four preforms P aligned by the aligning mechanism 36 vertically upward to load the four preforms P held in up-side-down position by one of the carrier holding portion 315 of the reversing mechanism.

The aligning mechanism 36 has a preform transferring plate 361 formed with four arc-shaped grooves formed in a given pitch and a directly acting cylinder 362 for shifting the transferring plate 361 horizontally in a given pitch. At every time of reception of the preform P in each groove of the preform transferring plate 361, the preform transferring plate 361 is moved horizontally at a given feeding pitch.

As shown in FIG. 6, in order perform transfer of the preform P from the titled supply groove 351 to each groove of the transferring plate 361 at good timing, a restriction claw 352 for restricting movement of the preform P in the lower end portion of the tilted supply groove 351, is arranged. The restriction claw 352 is movable between a projecting position, at which the claw restricts movement of the preform and a retracted position at which the movement of the preform is performed freely.

The transfer member 361 situated in a condition where the preforms P(1) to P(4) are hanged in respective grooves formed in the given pitch, is then lifted upwardly by the loading mechanism 37 with maintaining the attitude thereof. The loading mechanism 37 has a lifting cylinder 371. By the lifting cylinder 371, the transferring plate 361 is moved between the initial position shown in FIG. 4 and a lifted position where the insertion core portions 73 of the preform carriers 7 are completely inserted into the openings P1 of the preforms P hanged on the transferring plate 361.

It should be noted that, in the shown embodiment, as can be appreciated from FIG. 4, a support plate 363 is mounted on the base frame 2. On the support plate 363, a support plate 365 supporting the lifting cylinder 371 via a horizontally extending linear guide 364. On the tip end of an actuation rod of the lifting cylinder 371, the transferring plate 361 is fixedly mounted.

As set forth above, preforms P are loaded per four from the lower side for the four preform carriers 7(1) to 7(4) held in the up-side-down (downwardly oriented) position by the carrier holding portion 315 of the reversing mechanism 31. After loading of the preforms P(1) to P(4), the pivoting member 314 is pivoted by the rotary cylinder 310. Then, the carrier holding portion 315 reaches the position of the carrier holding position 316 in FIG. 4. Conversely, the carrier holding portion 316 reaches the position of the carrier holding portion 315 in FIG. 4. Thereafter, the plunger 331 and 332 are driven to release respective preform carriers 7 held on the carrier holding portions 315 and 316 for free slide.

Next, as shown in FIG. 1, by driving the push rod 38, the four preform carriers 7 held in the guide grooves of the carrier holding portion 315 are pushed out horizontally from the guide groove of the carrier holding portion 315. Adjacent position of the carrier holding portion 315, one ends of the upper guides rails 8(1) are located. Therefore, the preform carriers 7 pushed out from the carrier holding portion 315 are transferred to the upper guide rails 8(1).

While the preform carriers 7 holding the preforms P are transferred from the preform supply portion 3 to the upper guide rails 8(1), the following operation is taken place on the side of the carrier holding portion 316 on the other side of the reversing mechanism 31. At first, for the carrier holding portion 316, the four preform carriers 7 are transferred from the lower guide rails 8(4) in upside-down position (downwardly oriented position). For the four preform carriers 7 held on the carrier holding portion 316, the preforms P are loaded from the lower side, in the manner set forth above.

The reversing mechanism 31 transfers the four preform carriers 7(1) to 7(4) holding the preforms P in one of the carrier holding portion to the upper guide rails 8(1), and in turn, receives the four preform carriers 7(1) to 7(4) in the other carrier holding portion. After loading the preforms on the empty preform carriers held on the other carrier holding portion, the pivoting member 314 is pivoted to place the carrier holding portion at pivot stop position on the opposite side. With repeating such operation, supply of the preform P is performed.

As set forth above, in the shown embodiment of the preform supply portion 3, the reversing mechanism 31 has carrier holding portions 315 and 316 at symmetric position on both ends of the pivoting member 314 to achieve good balance in pivoting motion to realize smooth pivoting operation. Therefore, pivoting speed can be speeded up. Furthermore, since different operations can be performed simultaneously in the carrier holding portions 315 and 316 at both ends, work efficiency becomes higher. Accordingly, it becomes possible to speed-up operation speed of the biaxially stretching blow molding apparatus 1.

On the other hand, since the carrier holding portions 315 and 316 on both ends of the pivoting member of the reversing mechanism are placed at different height positions, it becomes possible to transfer the preform carriers from the lower guide rails 8(4) to the upper guide rails 8(1) located at different height levels with simple mechanism.

(Transporting Path 8(2))

Next, the preform carriers 7 transferred per four to the upper guide rails 8(1) are fed forward along the upper guide rails 8(1). As shown in FIG. 1, the front end portion 821 of the guide rails 821 of the guide rails 8(1) are bent to be placed in the vicinity of a loop form transfer member transporting path. As a result, the preform carrier 7 reaching the front end portion of the guide rails 8(1) is received within the groove defined in the transporting member 84 which is circulated along the loop form path. Namely, the preform carrier 7 is situated in the condition where the larger diameter flange 74 rides on the edge of the groove. Thereafter, the preform carrier 7 supporting the preform P is transported by the transfer member 84.

As set forth above, five heating portions 4(1) to 4(5) are arranged on the transporting path of the transfer member 84. The preform P transported by the transfer member 84 is heated at a temperature condition suitable for molding. On the other hand, in the heating portion, the drive mechanisms 85 and 86 are arranged. Respective drive mechanisms 85 and 86 have timing belts 853 and 863 stretched between drive gears 851 and 861, driven gears 852 and 862. Respective timing belts 853 and 863 are arranged to mesh with the annular external gear 75 of each preform carrier 7 transported by the transfer member 84. Accordingly, the preform carrier 7 transported by the transfer member 84 is caused rotation of the cylindrical main body 7 rotatably set inside of the larger diameter flange 74 riding on the transfer member 84, on its own axis by the timing belts 853, 863. Namely, the preform P loaded on the insertion core portion 74 formed on the tip end of the cylindrical main body 71, rotates on its own axis.

Thus, the preform P transported across the heating portion 4(1) to 4(5) are transported with rotation on its own axis, respective portion of the outer peripheral surface can be heated uniformly.

On the other hand, by varying the position of the front end portion 821 of the guide rail 8(1) to the position between the heating portions 8(1) and 8(2), number of the heating portion to pass the preform, in other words, a heating condition, such as heating period, can be easily varied.

(Pitch Expansion Mechanism and Transfer Mechanism)

The preform P after heating is expanded the feed pitch by the pitch expansion mechanism 9 and then fed into the stretch-molding portion 5 along the guide rails 8(3) by the transfer mechanism 10. On the other hand, by the transfer mechanism 10, the molded product F obtained by the stretch-molding portion 5 is transported outside of the stretch-molding portion 5 along the guide rails 8(3) and transferred to the molded product taking out portion 6.

Figure 8:
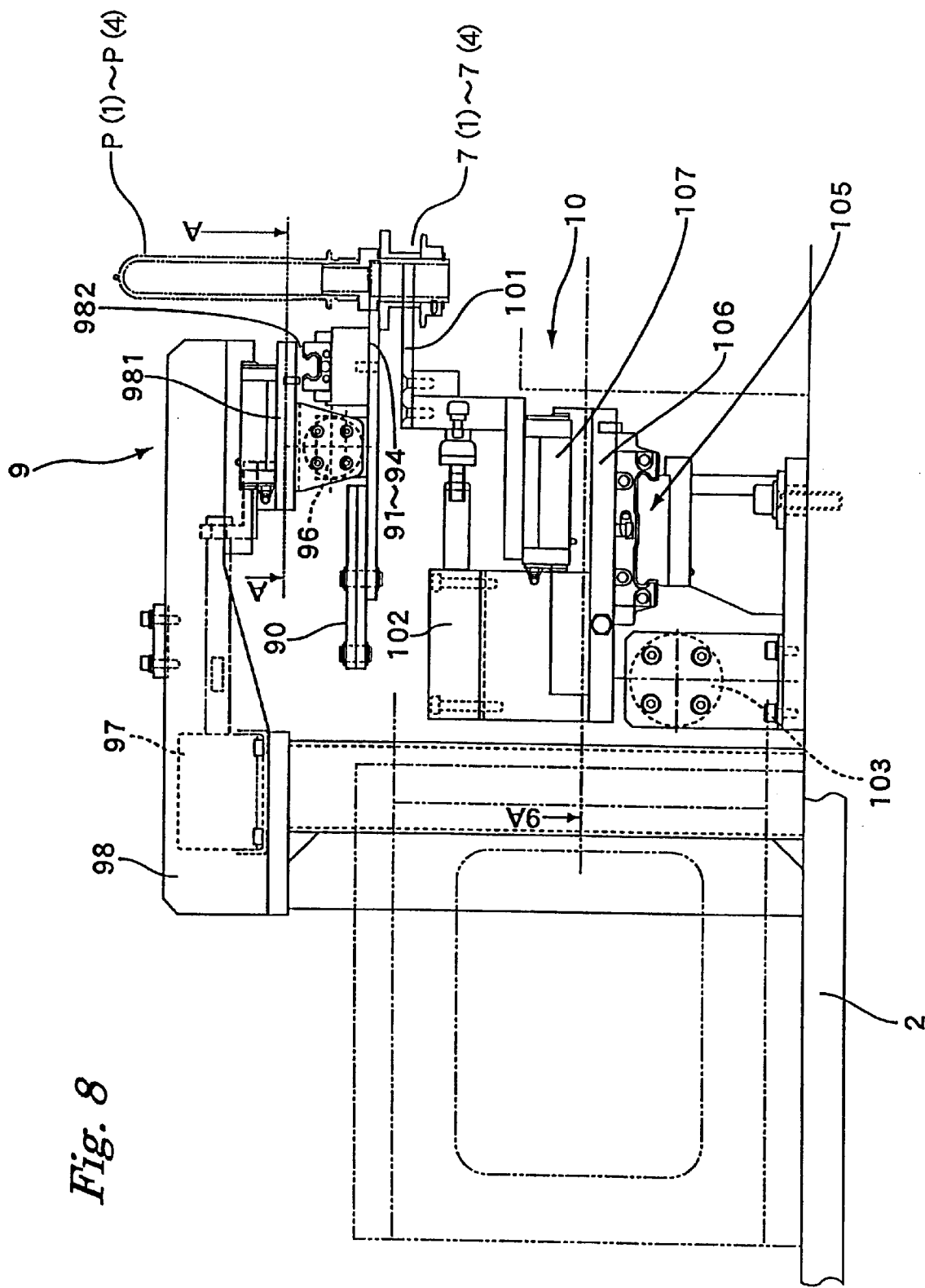
FIG. 8 is a schematic constructional illustration of the case where a pitch expansion mechanism and a transfer mechanism are viewed from a preform transporting direction in the biaxially stretching blow molding apparatus of FIG. 1.
Figure 9:
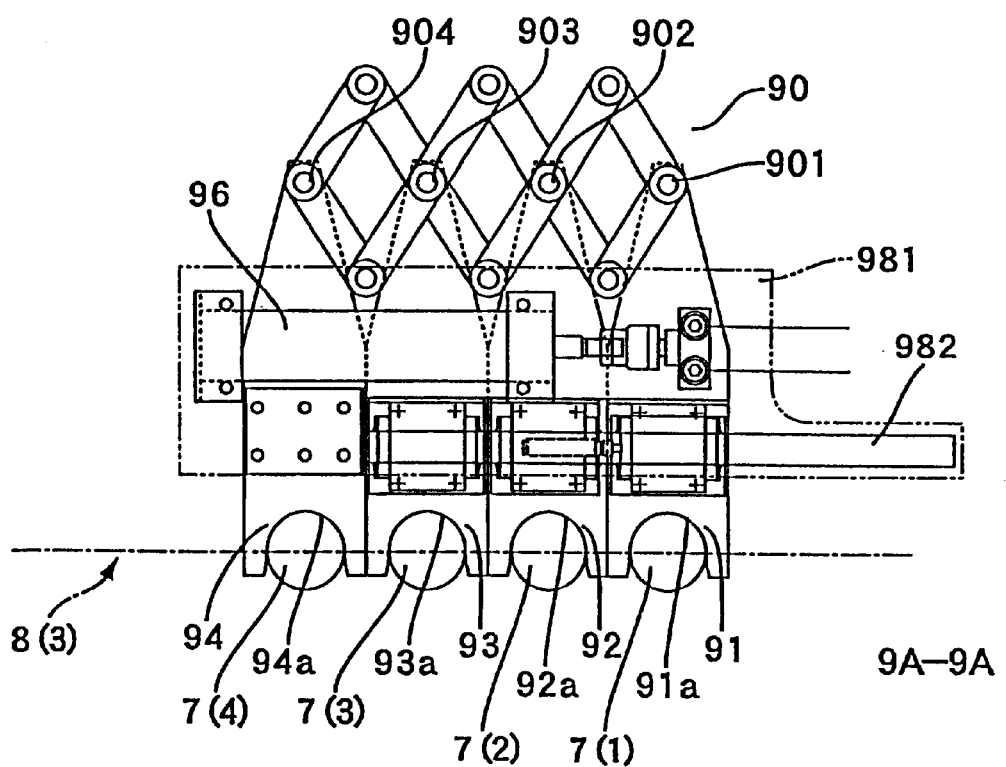
FIG. 9 is a schematic plan view of the pitch expansion mechanism of FIG. 8.
Figure 10:
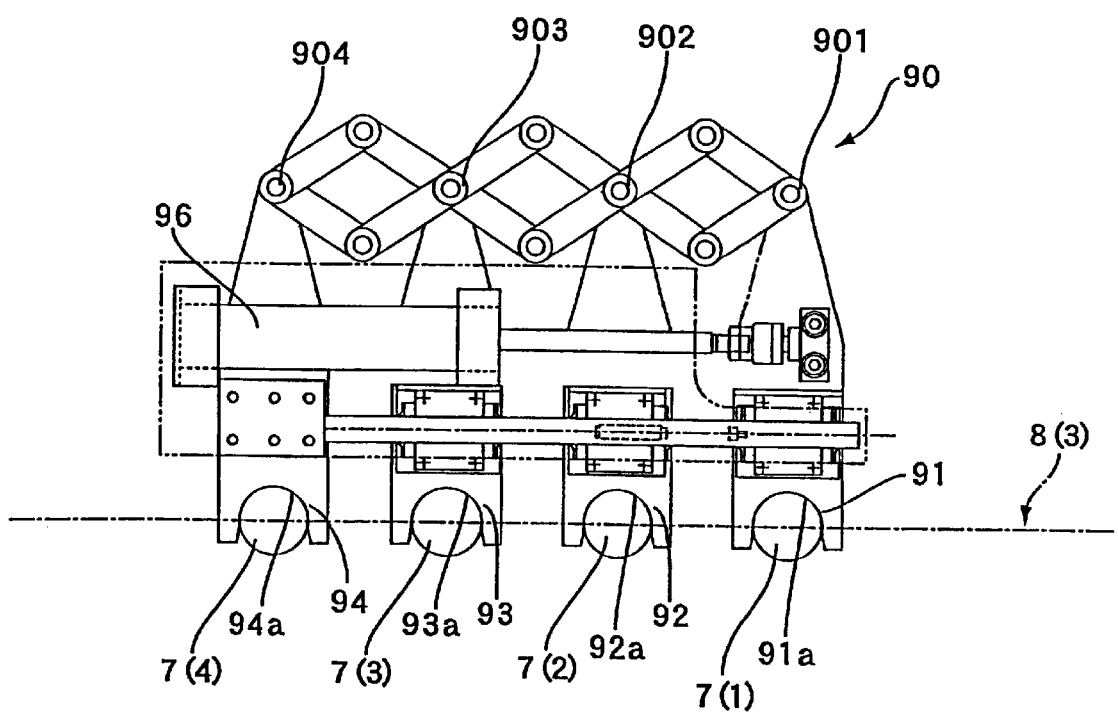
FIG. 10 is a schematic plan view of the pitch expansion mechanism of FIG. 8.

FIG. 8 is a schematic constructional illustration of the case where a pitch expansion mechanism and a transfer mechanism are viewed from a preform transporting direction, FIG. 9 is a schematic plan view of the pitch expansion mechanism before pitch variation as viewed in the direction of arrow 9A of FIG. 8, and FIG. 10 is a schematic plan view of the pitch expansion mechanism after pitch variation. Constructions of the pitch expansion mechanism and the transfer mechanism will be discussed with reference to these drawings.

At first, the pitch expansion mechanism 9 includes a pantograph mechanism 90 expandable along the guide rails 8(3), a directly acting cylinder 96 for expanding and contracting the pantograph mechanism 90 along the guide rail 8(3), and a directly acting cylinder 976 for moving the transfer members 91 to 94 back and forth in a direction perpendicular to the direction of the guide rails 8(3).

More particularly, as can be appreciated from FIGS. 8 and 9, on a tip end of a support arm 98 mounted on the base frame 2, movable support plate 981 which is movable in a direction toward and away from the guide rails 8(3). The movable support plate 981 is movable in a direction perpendicular to the preform transporting direction by the directly acting cylinder 97 mounted on the support arm 98. On the movable support plate 981, the main body of the directly acting cylinder 96 is mounted. In conjunction therewith, four transfer members 91 to 94 are supported via a linear guides 982. The actuation rod side of the directly acting cylinder 96 is connected to the transfer member 91.

As can be appreciated from FIG. 9, the rear ends of four transfer members 91 to 94 are rotatably connected with four link articulated points 901 to 904 of the pantograph mechanism 90. On the front ends of the transfer members 91 to 94, grooves 91a to 94a which can receive cylindrical main bodies 71 of the preform carriers 7 are formed. It should be noted that while neglected from illustration, the preform carriers 7(1) to 7(4) transported along the guide rails 8(3) are stopped at the position shown in FIG. 9 by means of a stopper.

Operation of the pitch expansion mechanism 9 constructed as set forth above will be discussed. In the initial state, the transfer members 91 to 94 are placed in retracted position retracted from the guide rails 8(3). When the preform carrier 8(1) to 7(4) supporting the preforms P(1) to P(4) reach the position opposing to the grooves 91a to 94a of respective transfer members 91 to 94 placed in the retracted position, respective transporting plates 91 to 94 are driven forward by the directly acting cylinder 97 to reach the position shown by solid line in the drawing to receive the cylindrical main bodies 71 of respective preform carriers 7(1) to 7(4).

Next, the pantograph mechanism 90 is expanded by the directly acting cylinder 98. As a result, intervals between the transfer members 91 to 94 are connected at respective articulated points are expanded. Thus, pitch of the preform carriers 7(1) to 7(4) held on the transfer members 91 to 94, in other words, the pitch of the preforms P1 to P4 supported thereon, is expanded.

After thus expanding the pitch, the transfer members 91 to 94 are returned to the retracted position by the directly acting cylinder 97. Next, the transfer member 91 to 94 are narrowed the interval to the initial interval by the directly acting cylinder 96.

Next, construction of the transfer mechanism 10 for transferring the four preform carriers 7(1) to 7(4) with maintaining the expended pitch will be discussed.

The transfer mechanism 10 includes a transfer plate 101, a directly acting cylinder 102 for moving the transfer plate 101 back and forth in a direction perpendicular to the guide rails 8(3), and a directly acting cylinder 103 for moving the transfer plate 101 back and forth for a given distance along the guide rails 8(3).

Figures 11A, 11B:
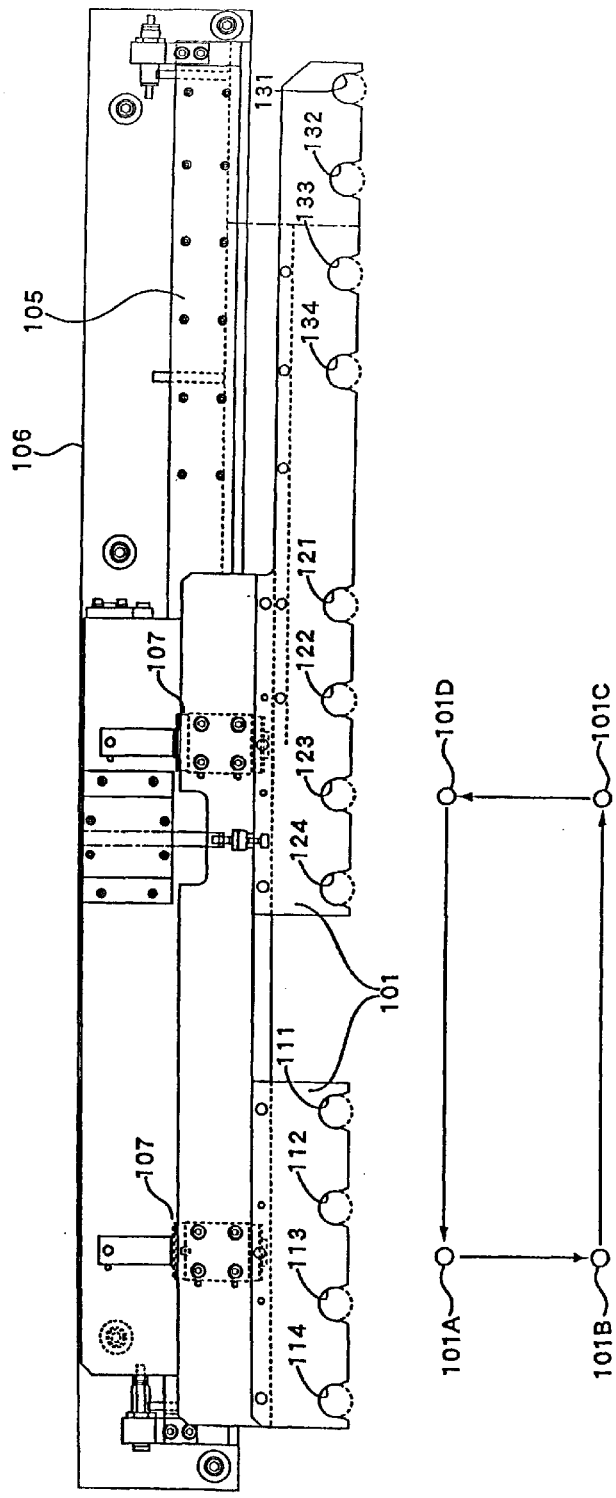
FIG. 11A is schematic plan view of a transfer mechanism on FIG. 8.
FIG. 11B is an explanatory illustration showing a motion path of a transfer member.

Particularly, as shown in FIGS. 8 and 11, by the base frame 2, the movable support plate 106 is supported via a linear guide 105. Between the base frame 2 and the movable support plate 106, the directly acting cylinder 103 is connected. On the movable support plate 106, the transfer plate 101 is supported via the linear guide 107. Between the movable support plate 106 and the transfer plate 101, the directly acting cylinder 103 is connected.

The transfer plate 101 are formed with respective four grooves 111 to 114, 121 to 124 and 131 to 134 with an interval corresponding to the expanded feed pitch, at the ends facing with the guide rails 8(3). These three groups of grooves are formed in equal interval per each group in the direction along the guide rail.

On the other hand, each groove is a groove which can receive a cylindrical portion 74a of the larger diameter flange 74 of the preform carrier 7(1) to 7(4) aligned with the expanded feed pitch.

Furthermore, each groove group is placed in such a position that while the central group of the grooves 121 to 124 are placed in the stretch-molding portion 5, the group of the grooves 111 to 114 located upstream side in the transporting direction are placed for receiving the preform carriers 7(1) to 7(4) after expansion of the pitch by the pitch expansion mechanism 9, and the group of the grooves 131 to 134 located downstream side in the transporting direction are placed completely transported out of the stretch-molding portion 5.

The transfer plate 101 constructed as set forth above is moved between a retracted position retracted in the direction perpendicular to the guide rail 8(3) by means of the directly acting cylinder 102 and a frontwardly shifted position receiving the preform carriers 7 in respective grooves, as shown in FIGS. 8 and 11. On the other hand, the transfer plate 101 is moved between an initial position shown in FIG. 11 and a feed position where the group of the grooves 111 to 114 reach the position of the next group of the grooves 121 to 124. At this feed position, the group of the grooves 121 to 124 reaches the position of the group of grooves 131 to 134, and the group of the groups 131 to 134 reaches a position of the molded product taking out portion 6 which will be discussed later.

The operation of the transfer mechanism 10 constructed as set forth above will be discussed. As set forth above, once the feed pitch of the four preform carriers 7(1) to 7(4) is expanded by the pitch expanding mechanism 9, in advance of placing the our transfer members 91 to 94 of the pitch expansion mechanism 9 at the retracted position, the transfer plate 101 placed at the retracted position (101A of FIG. 11A) is moved to the frontwardly shifted position (101B) to hold the four preform carriers 7(1) to 7(4) with the expanded feed pitch. Thereafter, the four transfer members 91 to 94 of the pitch expansion mechanism 9 placed into the retracted position.

Next, the transfer plate 101 is fed from the frontwardly shifted position (101B) to the feed position (101C) shown in FIG. 11 by the directly acting cylinder 103. As a result, the four preform carriers 7(1) to 7(4) held on the group of the grooves 111 to 114 of the transfer plate 101 reach the stretch-molding position of the stretch-molding portion 5.

Here, upon feeding, the four preform carriers 7(1) to 7(4) held by the group of the grooves 121 to 124 of the transfer plate 101 are fed out from the stretch-molding portion 5. Namely, the molded products F are fed out from the stretch-molding portion 5. On the other hand, the four preform carriers 7(1) to 7(3) held by the remaining group of the grooves 131 to 134 are fed out to the molded product taking out portion 6.

Next, the transfer plate 101 is retracted from the guide rail 8(3) to the retracted position (101D) by the directly acting cylinder 102. Thereafter, the transfer plate 101 is returned to the initial position (101A) by the directly acting cylinder 103.

During a period, in which the transfer plate 101 of the transfer mechanism 10 is retracted from the feed position (101C) to the retracted position (101D), and further returns to the initial position (101A), the operation to widen the feed pitch of the four preform carriers 7(1) to 7(4) fed in the narrower feed pitch is performed on the side of the pitch expansion mechanism 9, simultaneously with the foregoing operation. At a timing where the transfer plate 101 of the transfer mechanism 10 is returned to the initial position thereof, the pitch expansion operation has already be completed.

Thus, in the shown embodiment, the feed pitch expansion mechanism 9 for performing feed pitch varying operation and the transfer mechanism 10 for transporting the preform carriers which is active after expansion of the feed pitch are formed in separate constructions. Accordingly, both are operated simultaneously. As a result, operation speed of the biaxially stretching blow molding apparatus can be speeded up.

(Stretch-Molding Portion)

In the stretch-molding portion 5, biaxially stretching blow molding is performed for the preforms P(1) to P(4) supported by the four preform carriers 7(1) to 7(4) fed into the stretch-molding position as set forth above by the transfer mechanism 10 along the guide rail 8(3) to form the PET bottle F.

Figure 12:
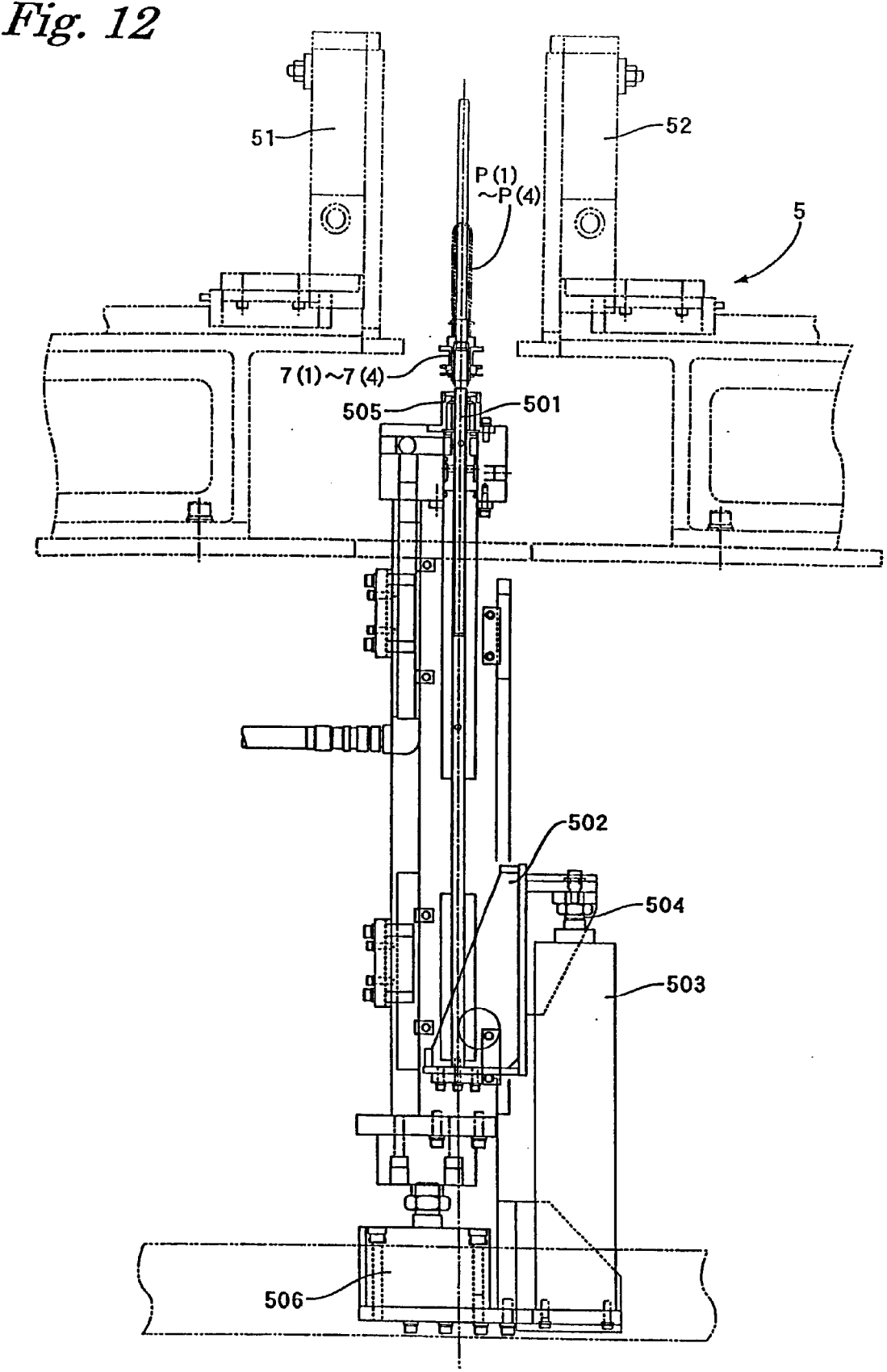
FIG. 12 is a schematic partial constructional illustration of a stretch-molding portion in the biaxially stretching blow molding apparatus of FIG. 1.

In FIG. 12, there is shown a schematic construction of a stretching rod lifting mechanism and a blowing air supply mechanism in the stretch-molding portion 5 as viewed in the preform transporting direction. As shown in FIG. 12, immediately below the four preform carriers 7(1) to 7(4) transported to the stretch-molding position, respective stretching rods 501 are placed in stand-by state as shown in FIG. 12. The stretching rod 501 is supported on an actuation rod 504 of the stretching cylinder 503 via a supporting bracket 502. By expanding the actuation rod 504 of the stretching cylinder 503, the stretching rod 501 penetrates into corresponding one of the preforms P(1) to P(4) through the cylindrical main body 71 of one of the preform carriers 7(1) to 7(4) to be lifted up to the position shown by the phantom line with performing stretching operation.

On the other hand, a cylindrical core 505 for supplying blow air is arranged at the position immediately below the preform carrier with coaxially surrounding the stretching rod 501. The cylindrical core 505 is lifted up with small stroke by a cylinder 506 for the blow core. At the lifted position, the cylindrical core 505 is connected to the lower end opening of the cylindrical main body of the preform carrier. To the cylindrical core 505, a blow air is supplied from a not shown compressed air supply source. Accordingly, when the blow air is supplied in the condition where the cylindrical core 505 is lifted and connected to the preform carrier, the blow air is supplied into the preform via the cylindrical core 505 and the preform carrier.

As set forth above, by stretching action by the blow air and the stretching rod, the preform is subject to biaxially stretching molding in the cavity for forming the PET bottle defined by a pair of stretch-molding dies 51 and 52 for stretch-molding.

Figure 13:
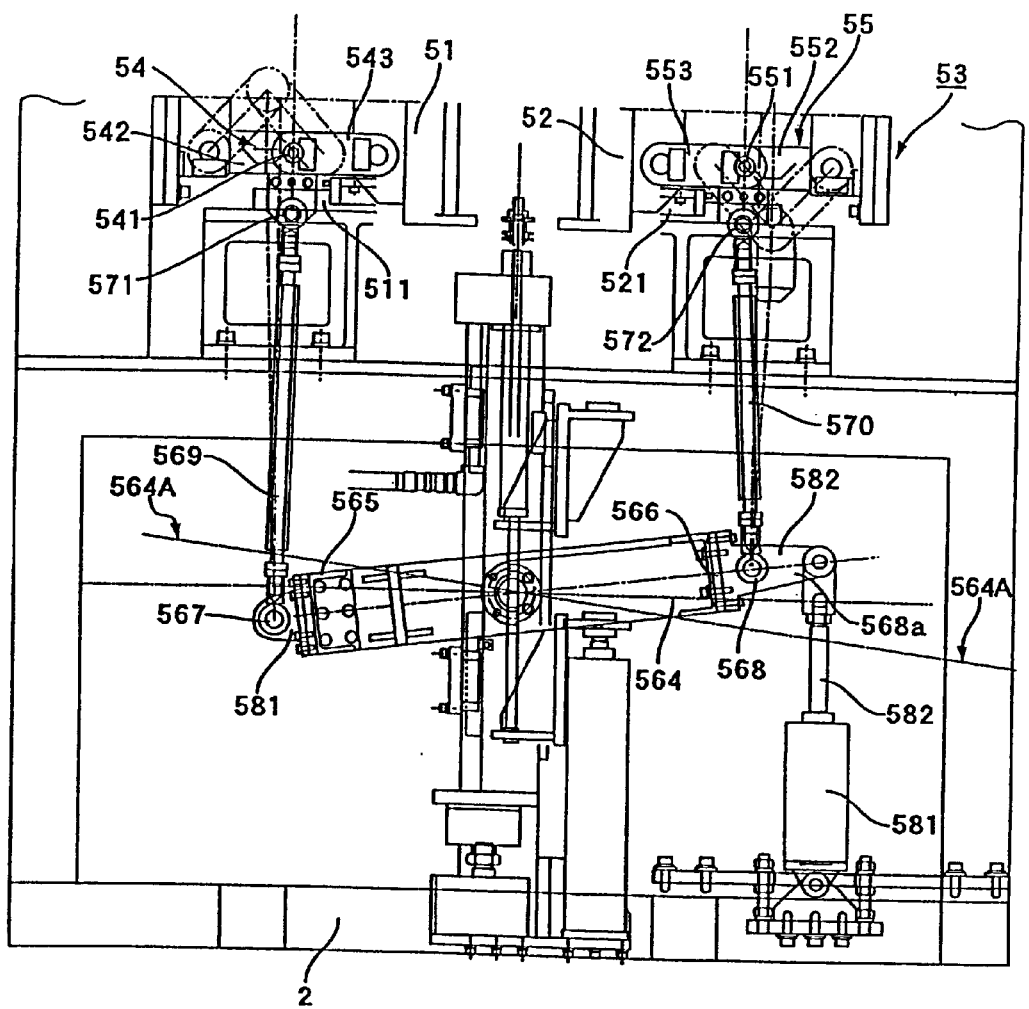
FIG. 13 is a schematic constructional illustration of a clamping mechanism of the biaxially stretching blow molding apparatus of FIG. 1 as viewed from a preform transporting direction.
Figure 14:
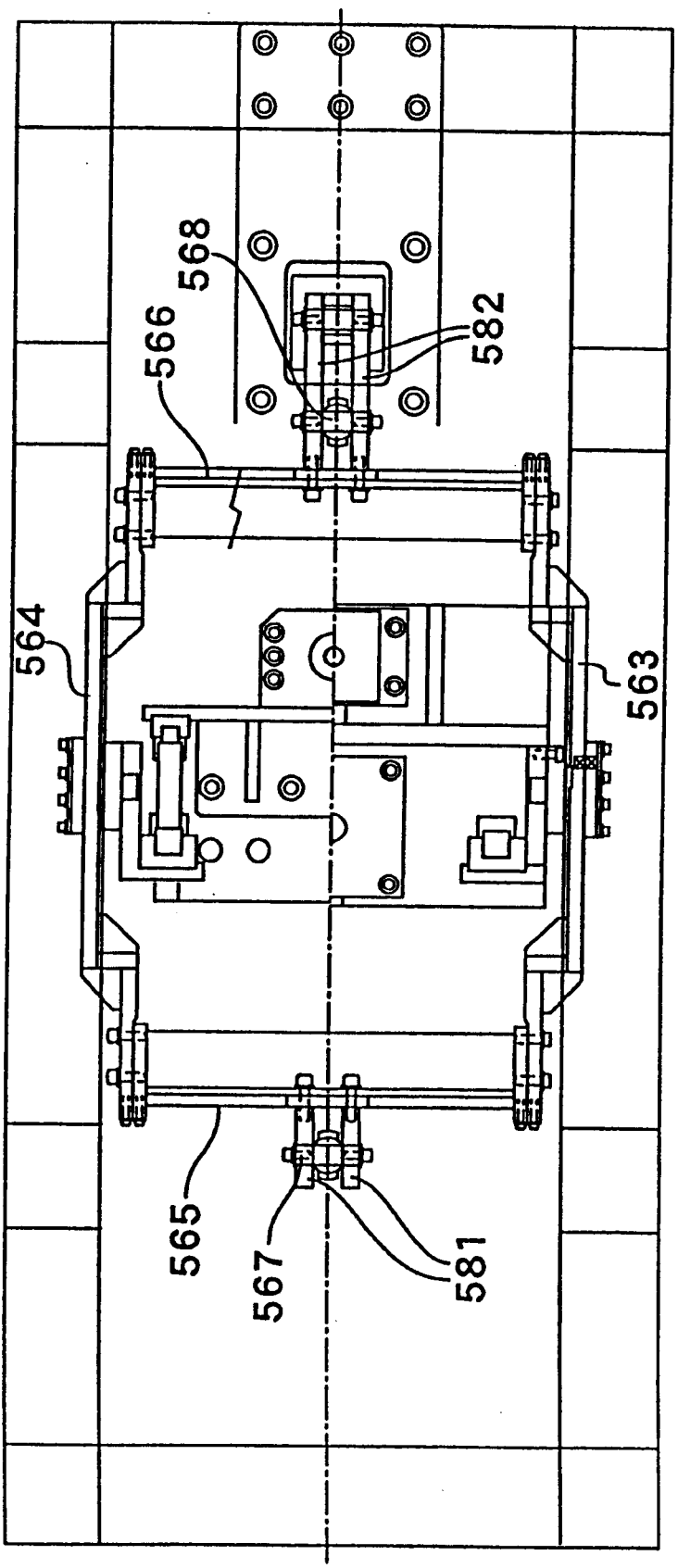
FIG. 14 is a partial schematic plan view of the clamping mechanism of FIG. 13.

Next, FIG. 13 is a schematic side elevation of the clamping mechanism as viewed from the preform transporting direction, FIG. 14 is a schematic plan view thereof, and FIG. 5 is a schematic side elevation as viewed from a direction perpendicular to the preform transporting direction.

Figure 15:
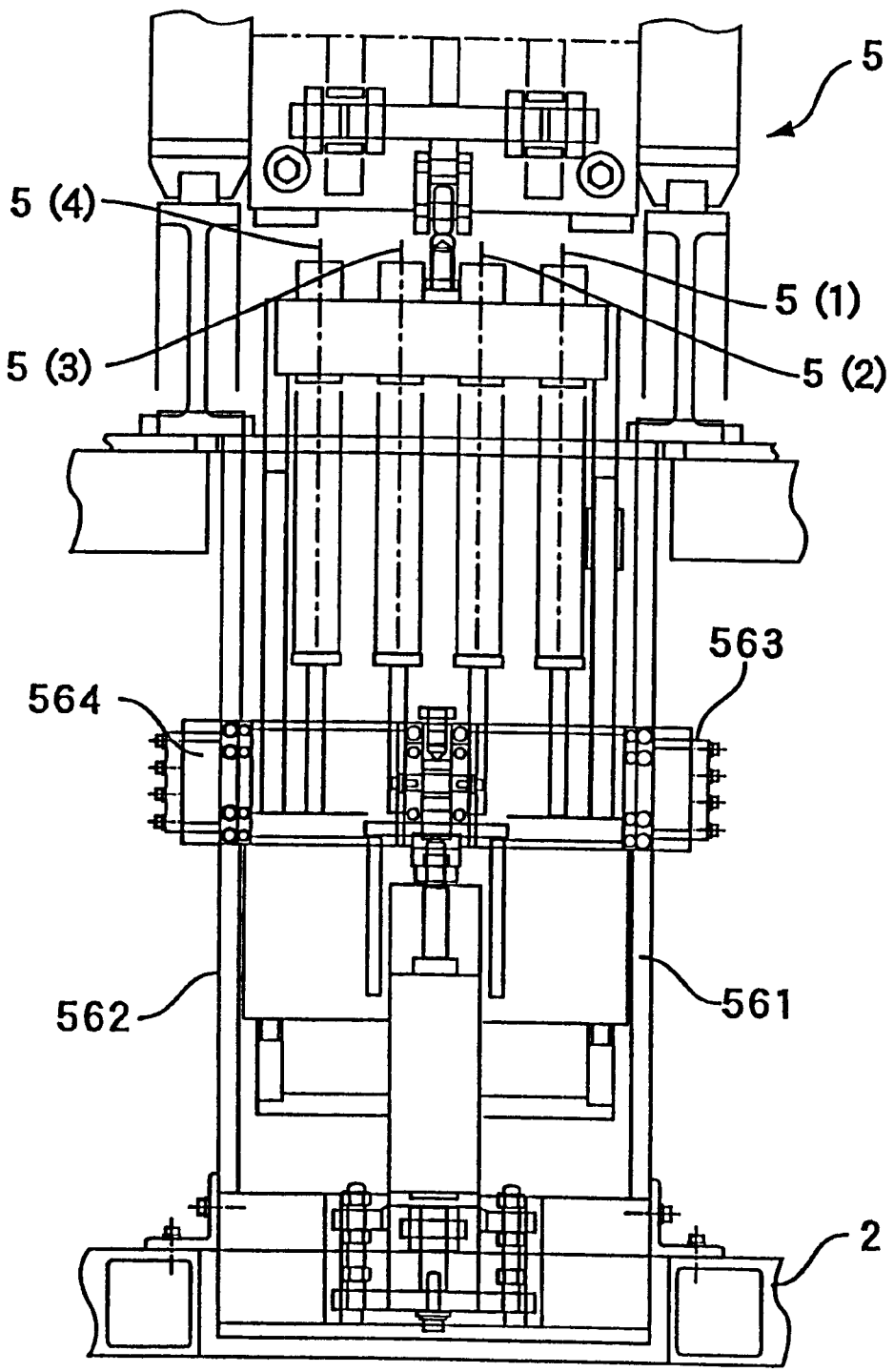
FIG. 15 is a schematic constructional illustration of the clamping mechanism of FIG. 13 as viewed in a direction perpendicular to the preform transporting direction.

Referring to FIGS. 13, 14 and 15, the clamping mechanism 53 has first and second toggle link mechanisms 54, 55, and swing mechanism 56 for reciprocating operation of the link joint points 541 and 551 in synchronism with that in opposite directions.

The first toggle link mechanism 54 is designed for moving one stretch-molding die 51 along the linear guide 511 supported on the base frame 2 between open position and close position. The first toggle link mechanism 54 has a construction, in which two links 542 and 543 are connected in the direction perpendicular to the preform transporting direction. The outer end of one link 542 is connected on the side of the base frame in rotatable fashion, and the inner end of the other link 543 is rotatably connected vertically relative to the stretch-molding die 51. In the clamped condition, two links 542 and 543 are extended horizontally, and in die open position, these link joint point 541 is pushed up and down in elbowed shaped configuration.

The second toggle link mechanism 55 basically has the same construction as the first toggle link mechanism 54. The other stretch-molding die 52 is moved between the open position and the closed position along the linear guide 521 supported on the base frame 2. The second toggle link mechanism 55 also has a construction in which two links 552 and 553 are connected in the direction perpendicular to the preform transporting direction. The outer end of one link 552 is connected on the side of the base frame in rotatable fashion, and the inner end of the other link 553 is rotatably connected vertically relative to the stretch-molding die 51. In the clamped condition, two links 542 and 543 are extended horizontally, and in die open position, these link joint point 541 is pushed up and down in elbowed shaped configuration.

The swing mechanism 56 has support plates 561 and 562 mounted on the base frame 2 in a condition located on both sides of the four stretch molding positions 5(1) to 5(4) of the stretch molding portion 4 in the preform transporting direction. On each of the support plates 561 and 562, swing plates 563 and 564 are mounted for swing motion in vertical direction. These swing plates 563 and 564 extend in parallel to the direction perpendicular to the preform carrier transporting direction.

On both end portions of each swing plate 563 and 564 are connected with each other by connecting member 565 and 566 extending in the preform transporting direction. At the center portion of each connecting members 565 and 566, connecting pin 567 and 568 extending horizontally in the preform transporting direction is mounted. To each connecting pin 567 and 568, lower end of vertically extending connection shaft 569 and 570 is connected rotatably.

On the link joint points 541 and 551 of the first and second toggle link mechanisms 54 and 55, connecting pins 571 and 572 extending horizontally in the preform transporting direction are mounted, respectively. To these connection pins 571 and 572, upper ends of the connection shafts 569 and 570 are connected in rotatable fashion.

Furthermore, a bracket 568 mounted on the central portion of one connecting member 566 connecting the swing plates 563 and 564 with each other, has a projecting portion 568a projecting outwardly from the connecting position of the connection shaft 570 relative to the center of swing. Immediately below the projecting portion 568a, a die opening and closing cylinder 581 mounted on the base frame 2 is arranged vertically. A tip end of an actuation rod 582 extending upwardly from the cylinder 581 is connected to the projecting portion 568a in rotatable condition.

Clamping operation of the clamping mechanism 53 constructed as set forth above will be discussed hereinafter. As can be seen from FIG. 13, in the clamping condition, the first and second toggle link mechanisms 54 and 55 are extended horizontally, and the swing plates 563 and 564 are held in slightly tilted condition ascending toward the stretch-molding die 52 with respect to horizontal direction.

Upon opening the die from the clamped condition, the actuation rod 582 of the cylinder 581 is retracted to pivot the swing plates 563 and 564 to be tilted in the opposite direction as shown by one-dotted line 564A relative to horizontal direction. By pivoting motion of the swing plates 563 and 564, the link connection point 541 of the first toggle link mechanism 54 connected to one ends thereof are pushed up to be in a condition shown in the phantom line in FIG. 13. In association therewith, the stretch-molding die 51 is retracted up to the open position. In contrast to this, the link connection point 551 of the second toggle link mechanism 55 is drawn down to be placed in the condition shown by phantom line in FIG. 13. In association therewith, the stretch-molding die 52 is retracted to the open position.

Thus, the first and second toggle joint mechanisms 54 and 55 are moved in opposite directions relative to each other with establishing synchronization. Accordingly, the stretch-molding dies 51 and 52 are retracted relative to each other in the condition where synchronization is established.

Conversely to the case set forth above, in the clamping operation, the swing plates 563 and 564 are pivoted to the tilted position shown by solid line of FIG. 13 by pushing out the actuation rod 582 of the cylinder 581. As a result, the links 542, 543 and links 552, 553 of the first and second toggle joint mechanisms 54 and 55 are vertically moved in opposite direction in synchronism with each other to be placed in horizontal condition. As a result, the stretch-molding dies 51 and 52 are moved forward in synchronism with each other to establish clamping condition.

In the shown embodiment of the clamping mechanism 53, utilizing movement at symmetric positions from a pivoting center in the swing plate of the common swing mechanism 56, a pair of toggle mechanisms for opening and closing a pair of stretch-molding dies are moved in mutually opposite directions with establishing complete synchronization. Accordingly, no localized load will never be exerted in respective portions of the clamping mechanism upon opening and closing of the dies to avoid problems in occurrence of wearing in respective portions and in exertion of impact to respective portions. Therefore, smooth and quick die opening and closing operation can realized to result in speeding up of operation of the biaxially stretching blow molding apparatus 1.

(Molded Product Taking Out Portion)

The molded product taking out portion 6 receives the preform carrier 7 supporting the molded product F obtained through the stretch-molding portion 5 from the upper guide rails 8(3), reverses the preform carrier 7 into the up-side-down position with maintaining the molded product, thereafter removes the molded product from the preform carrier 7, and then transfers the empty preform carrier 7 to the lower guide rails 8(4).

Figure 16:
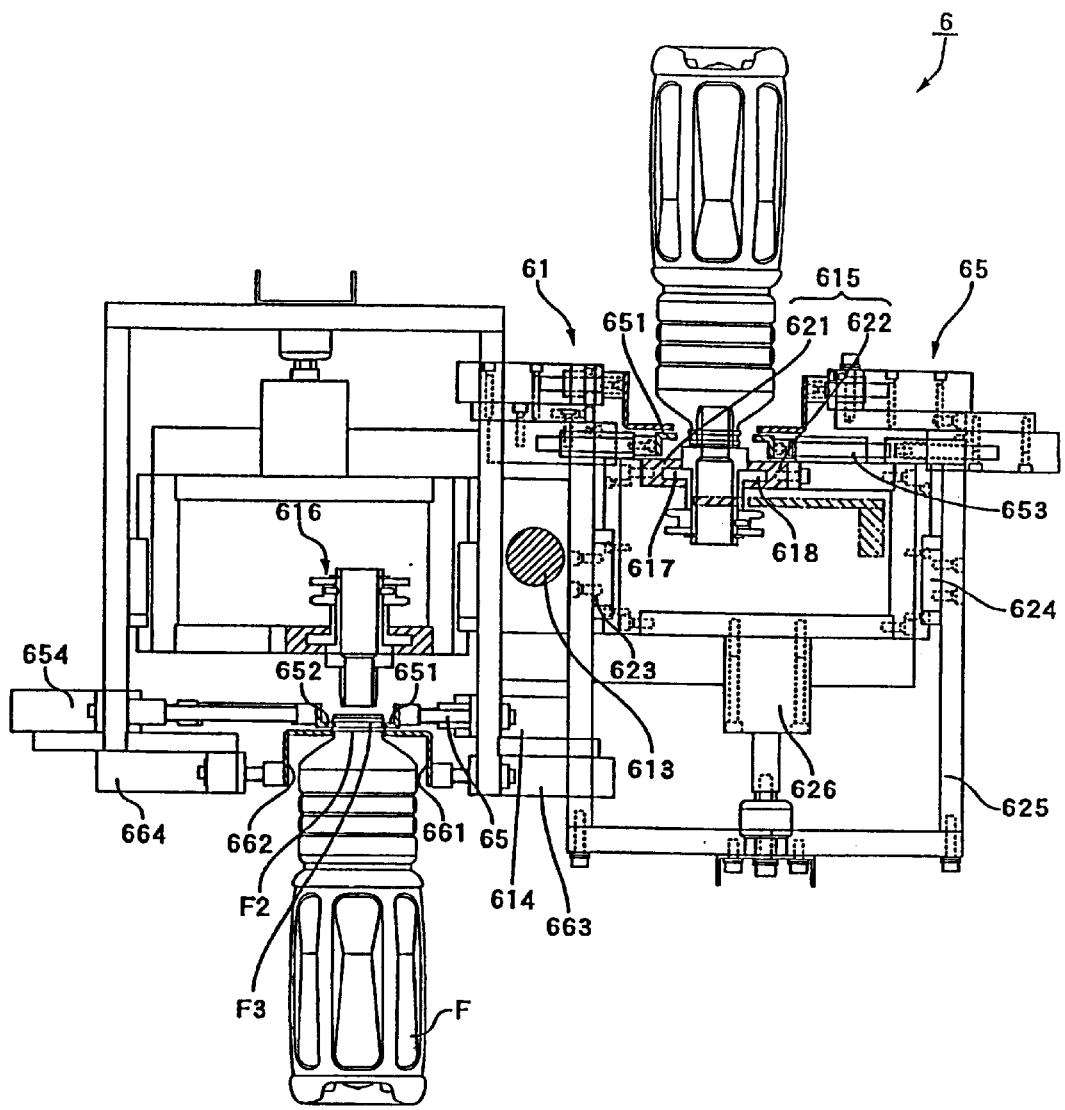
FIG. 16 is a schematic constructional illustration of a molded product taking out portion of the biaxially stretching blow molding apparatus of FIG. 1 as viewed from the preform transporting direction.
Figure 17:
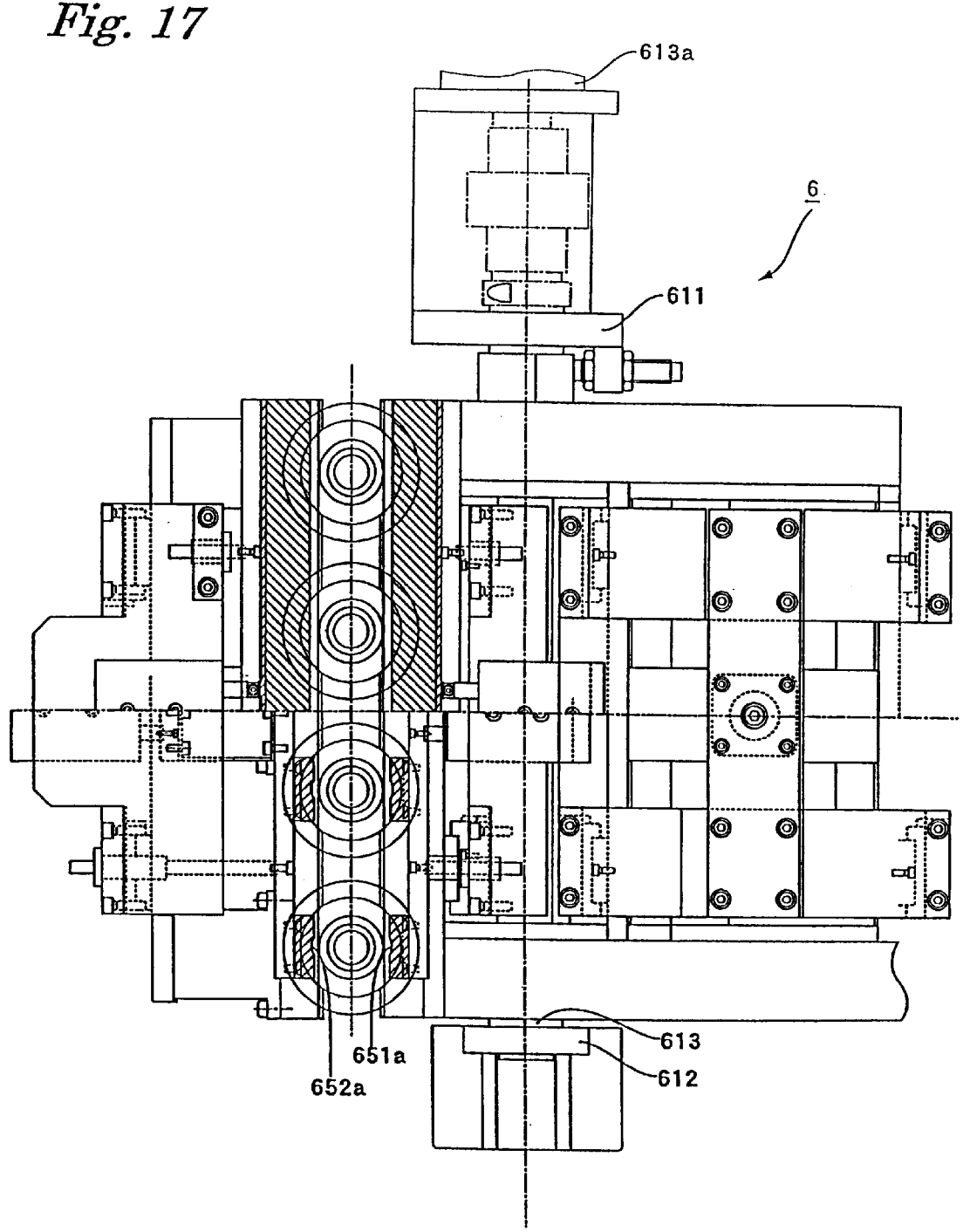
FIG. 17 is a schematic constructional plan view of the molded product taking out portion of FIG. 16.

FIG. 16 is a schematic constructional illustration of the molded product taking out portion 6 as viewed from the preform transporting direction, and FIG. 17 is a schematic constructional plan view of the molded product taking out portion of FIG. 16. The construction of the molded product taking output portion 6 will be discussed with reference to these drawings.

The molded product taking output portion 6 has a carrier reversing mechanism 61 for reversing the preform carrier 7 in elected position into up-side-down position, and an unloading mechanism 65 for removing the molded product F from the preform carrier 7 held in the up-side-down position as reversed by the carrier reversing mechanism 61.

The carrier reversing mechanism 61 has a pivot shaft 613 horizontally extending between a pair of support frames 611 and 612 mounted on the base frame 2, a rotary cylinder 613a for rotating the pivot shaft 613 in forward and reverse directions, and a pivot member 614 rotating integrally with the pivot shaft 613. The pivoting member 614 is formed into a shape symmetric about the pivot shaft 613 and has carrier holding portions 615 and 616 at both ends thereof.

The carrier holding portion 615 has a pair of guide rails 621 and 622 formed with a pair of guide grooves 617 and 618 which have the same cross-section as that of the guide rails 8(3). These guide rails 621 and 622 can be lifted relative to a support frame 625 mounted on the pivot member 614 via linear guides 623 and 634. On the support frame 625, a lifting cylinder 626 is mounted. By the lifting cylinder 626, the guide rails 621 and 622 are lifted with a given stroke.

In a condition where the guide rails 621 and 622 are placed in the initial position, the guide grooves 617 and 618 formed thereon are placed at positions matching with the guide grooves 805 and 806 on the guide rails 8(3) at the initial position of the pivot member 614, namely pivot stop position as shown in the drawing. The other carrier holding portion 616 also has guide rails 621 and 622 having a pair of guide grooves 617 and 618 of the same cross section as those of the guide rails 8(4). The guide grooves 617 and 618 formed on the guide rails 621 and 622 of the carrier holding portion 616 are also placed at positions matching with the guide grooves 805 and 806 on the guide rails 8(4) at the initial position of the pivot member 614, namely pivot stop position as shown in the drawing.

In the shown embodiment, respective carrier holding portions 615 and 616 have guide grooves of the length capable of holding four preform carriers at once for reversing preform carriers 7 per four.

Next, the molded product unloading mechanism 65 has a pair of gripping pieces 651 and 652 which can grip the neck portion F1 of the molded product F loaded on the preform carrier 7 held in the carrier holding portions 615 and 616, and a pair of guide plates 661 and 662 which can engage with annular projection F2 formed on the outer peripheral surface of the neck portion F1 of the molded product.

As can be seen from FIG. 17, a pair of the gripping pieces 651 and 652 are formed with curved grooves 651a and 652a which can grip a portion between two annular projections F2 and F3 of the neck portion F1 of the molded product from opposite sides thereof, on the front faces. In the shown embodiment, the gripping pieces 651 and 652 are respectively separated into four pieces to form four pairs. Respective pair of the gripping pieces can grip respective preform carriers 7(1) to 7(4) fed by the transfer mechanism 10 from the opposite sides, in place. Opening and closing of these gripping pieces 651 and 652 is performed by directly acting cylinders 653 and 654 mounted horizontally on the support frame 625 of the pivot member 614.

On the other hand, as can be seen from FIG. 17, inner edges 661a and 662a of a pair of guide plates 661 and 662 are formed into flat surfaces extending in parallel to the preform transporting direction. These guide plates 661 and 662 can enter into the lower side of the annular projection F2 of the neck portion F1 of the molded product. When such condition is established, the molding product F can be hanged from a pair of guide plates 661 and 662 by annular projection F2 and, in turn, slidable along the guide plates 661 and 662. Opening and closing of these guide plates 661 and 662 are performed by directly acting cylinders 663 and 664 mounted horizontally on the support frame 625 of the pivot member 614.

Operation of the molded product taking out portion 6 constructed as set forth above will be discussed. At first, the four preform carriers 7(1) to 7(4) with supporting the molded products F are fed into the upper carrier holding portion 615 of the reversing mechanism 61 placed in the stand-by state at the pivot stop condition shown in FIG. 16, along the upper guide rails 8(3), by the transfer plate of the foregoing transfer mechanism 10.

Thereafter, a pair of gripping pieces 651 and 652 are advanced from the retracted position shown in FIG. 16 to the advanced position by the directly acting cylinders 653 and 654 to grip both sides of the neck portion F1 of the molded product of respective preform carriers 7. In conjunction therewith, a pair of guide plates 661 and 662 are advanced from the retracted position shown in FIG. 16 to the advanced position by the directly acting cylinders 663 and 664 to be placed in the condition engaging with the annular side surface of the annular projection F2 of the neck portion F1 of the molded product on the preform carrier 7. Thereafter, the transfer plate of the transfer mechanism 10 is retracted.

Next, by pivoting the reversing mechanism 61 over 1800 about the pivot shaft 613, then, the carrier holding portion 615 placed at the right-upper position in FIG. 16 reaches the position of the other carrier holding portion 616 in FIG. 16. Conversely, the carrier holding portion 616 reaches the position of the carrier holding portion 615 in FIG. 16. Reversing the carrier holding portion 615 as set forth above, the four preform carries held therein is switched from the elected position to the up-side-down position.

Here, together with the carrier holding portions 615 and 616, respective components of the molded product unloading mechanism 65 mounted on the pivoting member 614 are reversed integrally. Accordingly, the molded product F supported by the preform carrier 7 is gripped the neck portion F by the gripping pieces 651 and 652 and is reversed with maintain a condition engaged with a pair of guide plates 661 and 662. Thus, upon reversing operation, the molded product will never loose off the preform carrier 7.

Next, by means of the lifting cylinder 626, the carrier holding portion 615 is lifted up. FIG. 16 shows a condition where the carrier holding portion 615 is lifted up. When the carrier holding portion 615 is lifted up, four preform carriers 7 are also lifted simultaneously. However, the molded products F supported by respective preform carriers 7 are held in conditions gripped by a pair of gripping pieces 651 and 652. Accordingly, when the preform carriers 7 are lifted up, the insertion cores 73 are released from the molded products F.

Thereafter, a pair of gripping pieces 651 and 652 are retracted to release the neck portion F1 of the molded product from gripped position. However, since a pair of guide plates 661 and 662 are held in a condition engaged with the lower annular projection F2 of the neck portion F1 of the molded product, the molded product F released from the gripping pieces 651 and 652 are placed in a condition hanged from a pair of guide plates 661 and 662. On the other hand, the molded products F can slide along the guide plates 661 and 662. After establishing this condition, four molded products F are fed in the direction opposite to the direction toward the lower guide rails 8(4) by not shown push rod to transfer to the transporting conveyer 665 shown in FIG. 1, by means of a not shown push rod. By the transporting conveyer 665, the molded products F are collected to the predetermined collecting portion (not shown).

In contrast to this, the four preform carriers 7 after removal of the molded product are fed toward the guide rails 8(4) by a push rod 671 shown in FIG. 1.

It should be noted that the foregoing discussion has been given mainly in connection with the operation on the side of one carrier holding portion 615, the similar removal of the molded products F, feeding out of the molded products and feeding out of the empty preform carriers are taken place even in the other carrier holding portion 616 at its lower position shown in FIG. 16, and infeeding of the preform carriers, gripping of the molded products by the gripping pieces and holding of the molded products by the guide plates are performed at its upper position.

As set forth above, in the shown embodiment of the molded product taking out portion 6, since the reversing mechanism 61 has the carrier holding portions 615 and 616 at symmetrical positions at opposite ends of the pivoting member 614, it may achieve good balance in pivoting to realize smooth pivoting operation to result in higher pivoting speed. Furthermore, since different operations can be performed simultaneously in the carrier holding portions 615 and 616 at both ends to achieve high work efficiency. Thus, operation speed of the biaxially stretching blow molding apparatus 1 becomes higher.

On the other hand, since height difference is provided between the carrier holding portions 615 and 616 at both ends of the pivoting member of the reversing mechanism 61,the preform carriers can be transferred from the upper guide rails 8(3) to the lower guide rails 8(4) located at different height levels relative to each other, with simply mechanism and quickly. As a result, operation speed of the biaxially stretching blow molding apparatus 1 becomes higher.

In addition to the construction set forth above, it becomes possible to construct the molded product taking out portion 6 to arrange a detection mechanism for checking good item and no-good item of the molded product supported on the preform carrier to control opening and closing of a pair of gripping pieces and a pair of guide plates on the basis of the result of checking by the detection mechanism. With employing this construction, if no-good item or rejected product is detected in the molded product taking out portion 6, such no-good item can be separately collected for convenience without feeding out on the side of the molded product collecting portion by simultaneously opening the gripping pieces and the guide plates for dropping down.

As set forth above, with the biaxially stretching blow molding apparatus according to the present invention, since operation efficiency of respective components can be enhanced, the biaxially stretching blow molding apparatus having high process speed can be realized.

Namely, in the biaxially stretching blow molding apparatus according to the present invention, the transfer operation of the preform carrier between the transporting path at different height level can be performed simultaneously for both transporting paths utilizing the reversing means. Accordingly, transfer operation of the preform carrier between the transporting paths can be done efficiently.

On the other hand, in the preform supply portion of the biaxially stretching blow molding apparatus according to the present invention, during a period, in which empty preform carrier receiving operation is performed in one of the preform carrier holding portions, loading of preform for the preform carrier and transferring of the preform carrier supporting the preform are performed in the other preform carrier holding portion. Therefore, preform carrier transferring operation between the transporting paths and preform supply operation for the preform carrier can be performed efficiently.

Furthermore, in the molded product taking out portion of the biaxially stretching blow molding apparatus according to the present invention, during a period, in which preform carriers supporting the molded products are received in one of the preform carrier holding portions, removal of the molded product from the preform carrier and feeding out of the empty preform carriers are performed in the other preform carrier holding portion. Accordingly, transfer of the preform carriers between the transporting paths and taking out operation of the molded products can be done efficiently.

Next, in the biaxially stretching blow molding apparatus, the feed pitch of the preform carriers is widened upstream of the stretch-molding portion by the pitch expansion mechanism, and after expansion of the feed pitch, the preform carriers are fed into the stretch-molding portion by transfer mechanism separately and independently of each other. Since the pitch expansion mechanism and the transfer mechanism which are operated separately and independently, operation for feeding the preform carriers carrying the preform into the stretch-molding portion after expansion of the feed pitch thereof, can be done efficiently.

On the other hand, in the biaxially stretching blow molding apparatus, the first and second toggle link mechanism movable in opposite directions and the swing mechanism for moving these first and second toggle link mechanism with establishing complete synchronization with each other are employed as the clamping mechanism for the stretch-molding dies. With such construction, clamping and opening of dies can be done efficiently. Also, upon these operations, exertion of local concentration of the load and impact can be avoided to perform clamping operation efficiently and smoothly.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A biaxially stretching blow molding apparatus for biaxial stretch-molding a preform into a predetermined shape by transporting a preform carrier supporting said preform along a transporting path extending across a heating portion and a stretch-molding portion, comprising:

first and second reversing means for reversing said preform carrier;

first and second transporting paths forming said transporting path;

said first reversing means receiving said preform carrier transported in an up-side-down position along said second transporting path, reversing the received preform carrier into an elected position, and transferring said preform carrier thus reversed to said first transporting path; and said second reversing means receiving said preform carrier transported in the elected position along said first transporting path, reversing the received preform carrier into the up-side-down position, and transferring said preform carrier thus reversed to said second transporting path.

2. The biaxially stretching blow molding apparatus as set forth in claim 1, wherein said first transporting path is an upper transporting path extending across a stretch-molding position of said stretch-molding portion, and said second transporting path is a lower transporting path extending on a lower side of said stretch-molding portion.

3. The biaxially stretching blow molding apparatus as set forth in claim 2, wherein at least one of said first and second reversing means has a pivoting member pivoting about a predetermined pivot center and a pair of preform holding portions formed at symmetric positions of said pivoting member with respect to said pivot center, one of said preform holding portions being placed at a height corresponding to said upper transporting path and the other preform holding portion being placed at a height corresponding to said lower transporting path at pivot stop position of said pivoting member.

4. The biaxially stretching blow molding apparatus as set forth in claim 3, wherein said preform holding portion formed in said pivoting means has a guide groove, into which said preform carrier can be inserted in a lateral direction in a condition not withdrawn in a vertical direction, said preform carrier having a slide portion sliding along said transporting path and being inserted into said guide groove, and a core projecting from said slide portion for inserting into said preform.

5. The biaxially stretching blow molding apparatus as set forth in claim 4, which further comprises a preform supply portion comprising:

said first reversing means having said pivoting member and said preform carrier holding portion;

preform inserting means for loading an opening portion of said preform from the lower side to said core of said preform carrier held in an up-side down position in a guide groove of one of said preform carrier holding portions in said first reversing means; and feeding out means for feeding out said preform carrier held in the elected position while supporting said preform in said guide groove of the other preform carrier holding portion of said first reversing means.

6. The biaxially stretching blow molding apparatus as set forth in claim 5, wherein said preform supply portion has a drop preventing means for preventing dropping of said preform loaded on said core of said preform carrier by said preform inserting means from said core.

7. The biaxially stretching blow molding apparatus as set forth in claim 4, wherein said molded product taking out portion comprising:

said second reversing means having said pivoting member and said preform carrier holding portion;

a pair of gripping pieces gripping neck portions of the molded products from both sides loaded on said preform carriers respectively held in said preform carrier holding portion;

gripping piece opening and closing means for moving said gripping pieces between a molded product gripping position and a molded product releasing position;

molding product removing means for removing said core of said preform carrier from the neck portion of said molded product gripped by said gripping pieces;

a pair of guide plates which can be guided in a horizontal direction while supporting the neck portions of said molded products loaded on said preform carriers respectively held in said preform carrier holding portion; and guide plate opening and closing means for moving said guide plates between guiding position of said molded product and a molded product releasing position retracted from said guiding position.

8. The biaxially stretching blow molding apparatus as set forth in claim 7, wherein said molded product taking out portion comprises detecting means for checking good item and no-good item of the molded product supported by said preform carrier; and control means for controlling opening and closing said pair of gripping pieces and said pair of guide plates on the basis of result of checking by said detecting means and controlling opening and closing of said pair of gripping pieces and said pair of guide plates when the preform is supported without being blow molded.

* * * * *